(12) United States Patent
Namba et al.

(10) Patent No.: US 8,914,079 B2
(45) Date of Patent: Dec. 16, 2014

(54) MOBILE INFORMATION TERMINAL, INFORMATION MANAGEMENT DEVICE, AND MOBILE INFORMATION TERMINAL INFORMATION MANAGEMENT SYSTEM

(75) Inventors: Toshiyuki Namba, Tokyo (JP); Satoshi Nagao, Anjo (JP); Kazuhiro Suzuki, Anjo (JP); Kazuo Okami, Nagareyama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/980,250

(22) PCT Filed: Jan. 19, 2011

(86) PCT No.: PCT/JP2011/050804
§ 371 (c)(1),
(2), (4) Date: Oct. 2, 2013

(87) PCT Pub. No.: WO2012/098651
PCT Pub. Date: Jul. 26, 2012

(65) Prior Publication Data
US 2014/0018101 A1 Jan. 16, 2014

(51) Int. Cl.
*H04M 1/00* (2006.01)
*H04W 24/00* (2009.01)
*H04W 4/02* (2009.01)
*G06Q 10/08* (2012.01)
*G06Q 50/28* (2012.01)
*G06Q 50/30* (2012.01)
*H04W 4/04* (2009.01)

(52) U.S. Cl.
CPC .............. *H04W 4/02* (2013.01); *G06Q 10/08* (2013.01); *G06Q 50/28* (2013.01); *G06Q 50/30* (2013.01); *H04W 4/046* (2013.01)
USPC ................. 455/569.2; 455/456.1; 455/456.2; 455/456.6; 455/457

(58) Field of Classification Search
USPC ..................... 455/569.2, 456.1–457
See application file for complete search history.

(56) References Cited

U.S. PATENT DOCUMENTS 5,699,056 A * 12/1997 Yoshida ........................ 340/905
6,012,012 A * 1/2000 Fleck et al. .................... 701/117
(Continued)

FOREIGN PATENT DOCUMENTS

JP 07-225895 8/1995
JP 11 328580 11/1999
(Continued)

OTHER PUBLICATIONS
International Search Report Issued Mar. 15, 2011 in PCT/JP11/050804 Filed Jan. 19, 2011.
(Continued)

*Primary Examiner* — Marisol Figueroa
(74) *Attorney, Agent, or Firm* — Oblon, Spivak, McClelland, Maier & Neustadt, L.L.P.

(57) ABSTRACT

Provided are a mobile information terminal, an information management device, and an information management system for mobile information terminals comprising the mobile information terminal and the information management device, with which it is possible to flexibly display also information that is voluntarily provided, for example, by a user, on map information. A navigation system of a vehicle acquires, by wireless communication, location information and post information that has been posted together with the location information, from an information management device of a management center in a state where the location information and the post information are associated. The navigation system controls the display of the acquired post information by a display device to be displayed in superposition in a location that is displayed upon the map information by the acquired location information.

15 Claims, 8 Drawing Sheets

(56) References Cited

U.S. PATENT DOCUMENTS

| | | | | |
|---|---|---|---|---|
| 6,587,777 | B1* | 7/2003 | St. Pierre | 701/117 |
| 2003/0083079 | A1* | 5/2003 | Clark et al. | 455/466 |
| 2004/0166832 | A1* | 8/2004 | Portman et al. | 455/412.1 |
| 2005/0267633 | A1* | 12/2005 | Waita | 700/245 |
| 2011/0130947 | A1* | 6/2011 | Basir | 701/119 |

FOREIGN PATENT DOCUMENTS

| | | |
|---|---|---|
| JP | 2002-015078 | 1/2002 |
| JP | 2002 081951 | 3/2002 |
| JP | 2004 286448 | 10/2004 |
| JP | 2006 178228 | 7/2006 |
| JP | 2007 011962 | 1/2007 |
| JP | 2007-058088 | 3/2007 |
| JP | 2008 015787 | 1/2008 |

OTHER PUBLICATIONS

Decision to Grant a Patent issued Jul. 2, 2013 in JP2012-527148, filed Jun. 12, 2012.

"Combined Traffic Information of Izu on Twitter", Shizuoka Newspaper (morning), Japan, Shizuoka Newspaper, May 2, 2010, p. 17.

"1000 Yen Highway, Traffic Expectation This Year During Golden Week", Nikkei Newspaper (evening), Japan, Nikkei, Inc., Apr. 28, 2010, p. 15.

* cited by examiner

Fig. 8
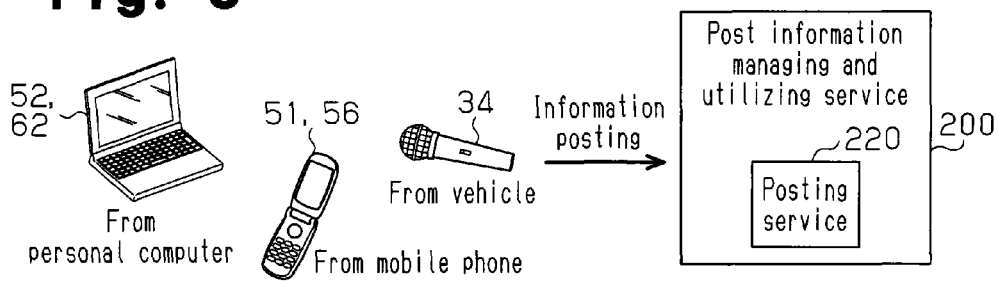
Fig. 9
| Importance degree | Vehicle | User |
|---|---|---|
| 4 | Presence | Presence |
| 3 | Absence | Presence |
| 2 | Presence | Absence |
| 1 | Absence | Absence |
Fig. 10
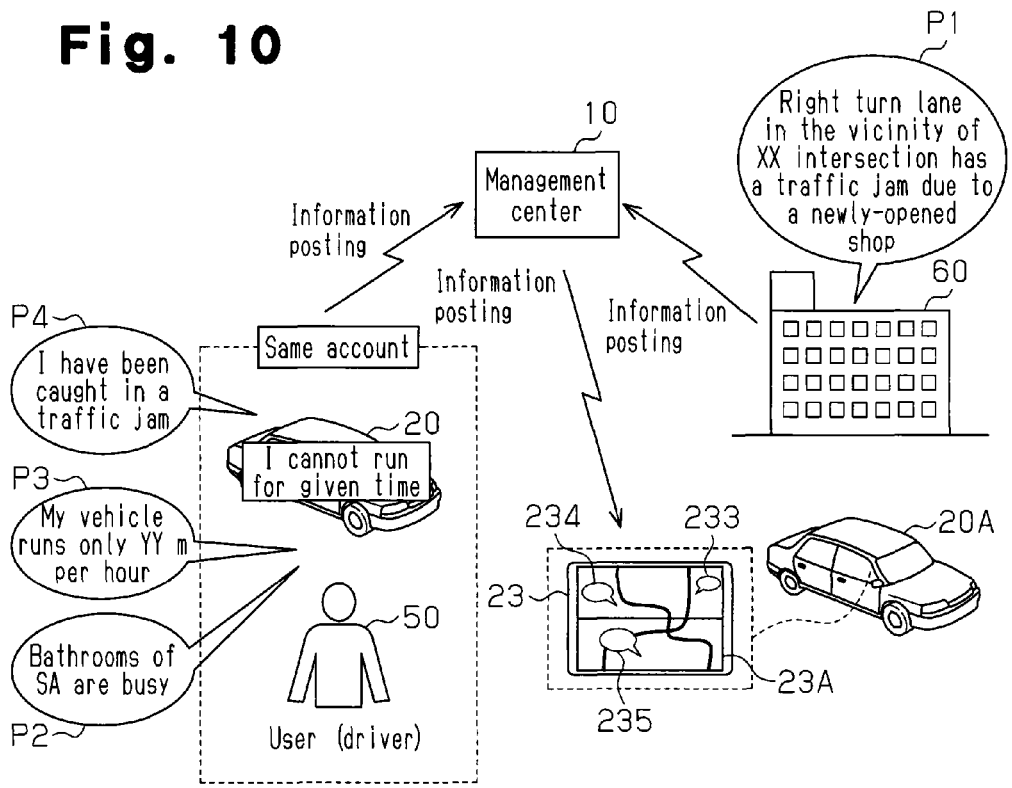

MOBILE INFORMATION TERMINAL, INFORMATION MANAGEMENT DEVICE, AND MOBILE INFORMATION TERMINAL INFORMATION MANAGEMENT SYSTEM

TECHNICAL FIELD

The present invention relates to a mobile information terminal and an information management device that process information associated with location information and an information management system for mobile information terminals that includes the mobile information terminal and the information management device.

BACKGROUND ART

For example, a vehicle as a mobile body is often provided with a mobile information terminal, or a car navigation system for assisting driving of the vehicle by displaying, on map information, a current location of the vehicle and a route from the current location to a destination. The map information mounted in the car navigation system generally includes information of facilities sited around a road together with road information showing an arrangement of the road itself. Hence, the car navigation system also displays information about facilities or the like around the road together with the road information as the map information.

Meanwhile, since contents of information about facilities or the like are frequently changed as compared with the road information, it is not easy for the car navigation system to renew the contents of the information about the facilities or the like whenever the information is changed, and to always maintain the latest state. Therefore, techniques have been proposed that make it possible for a car navigation system to maintain contents of information about the facilities, e.g., evaluation information about the facilities at the latest state, and one example of the techniques is described in Patent Document 1. A facility-information delivery system described in the Patent Document 1 includes a mobile information terminal (navigation device) that is provided in a vehicle for displaying map information, and an information management device (data server) provided outside the vehicle for sending a facility list to the mobile information terminal. The information management device sends, to the mobile information terminal, a questionnaire asking a user of the vehicle to input evaluation concerning facilities, and displays the evaluation on a screen of the mobile information terminal. The mobile information terminal sends back a user's answer to the questionnaire to the information management device. The information management device stores, in association with facilities, the answer to the questionnaire (user's evaluation) sent back from the mobile information terminal. Thereafter, when the facility list is sent to the mobile information terminal, the information management device sends the stored user's evaluation data to the mobile information terminal together with the facility list. Hence, the mobile information terminal displays, on the screen of the mobile information terminal, the user's evaluation contents concerning the facilities registered in facility list together with the location information about the facilities. As a result, the user's evaluation contents of facilities are renewed to the latest state.

PRIOR ART DOCUMENT

Patent Document

Patent Document 1: Japanese Laid-Open Patent Publication No. 2007-11962

SUMMARY OF THE INVENTION

Problems that the Invention is to Solve

As described above, according to the facility-information delivery system described in the patent document 1, the user's evaluation contents concerning facilities are reliably renewed to the latest state. However, such user's evaluation contents concerning facilities are limited to answers to questionnaires, and the user's facility evaluation contents themselves inevitably become limited. Further, the facility-information delivery system described in this document merely associates information with facilities included in the map information. That is, the facility-information delivery system of this document also has a problem that information concerning facilities not included in the map information cannot be delivered. Especially, due to popularization of various kinds of mobile information terminals of recent years, users often become information purveyors on the individual level. Under such a status, there are increasing demands for displaying provided information on the map information, not only associating information with facilities.

The present invention has been accomplished in view of such circumstances, and it is an objective of the invention to provide a mobile information terminal and an information management device capable of flexibly displaying also information that is voluntarily provided by a user, and an information management system for mobile information terminals that includes the mobile information terminal and the information management device.

Means for Solving the Problems

Means for achieving the above objective and advantages thereof will now be discussed.

To achieve the foregoing objective, the present invention provides a mobile information terminal: acquires location information and post information that have been posted together from an information management device possessed by a management center through wireless communication in a state where the location information and the post information are associated with each other; and controls a displaying manner of a display device such that the acquired post information is displayed, in a superposed manner, on a location of map information indicated by the acquired location information.

According to this configuration, since the location information is associated with the post information, the mobile information terminal can display the post information on the map information about the mobile information terminal based on this location information. Since the location information is associated with the post information as described above, the mobile information terminal can flexibly display the post information on any location on the map information without being constrained by facilities or the like on the map. Further, since constraints of the location information associated with the post information are reduced, posting of the post information is facilitated and therefore, convenience of the mobile information terminal, which utilizes the post information, is also enhanced. Especially according to this configuration, since the information management device handles the location information indicated as a location on the map information about the mobile information terminal, control of the mobile information terminal for displaying the post information on the map information about the mobile information terminal becomes easy.

The mobile information terminal displays post information on the map information about the mobile information terminal in a superposed manner. Thus, even if post information is irregularly given to the mobile information terminal, it becomes possible to reliably provide a user with information at a high real time level showing that the corresponding post information exists in map information that is being displayed. According to this, the mobile information terminal can easily renew not only post information having been accumulated in the information management device from long time ago but also post information accumulated in the information management device at the last minute into newer information to be displayed on the map information in a superposed manner. Such new information is effective for a user utilizing this information to ascertain the current traffic situation or to ascertain ongoing events around the region.

The post information, which has been posted together with the location information, is preferably information posted from another mobile information terminal to the information management device through wireless communication.

According to such a configuration, since the mobile information terminal can utilize more post information, convenience of the mobile information terminal, which utilizes the post information, is also enhanced.

The location information and the post information that have been posted from the other mobile information terminal to the information management device through wireless communication preferably include information that has been automatically sent from the other mobile information terminal based on an event that has occurred in the other mobile information terminal.

According to such a configuration, post information is automatically sent to the information management device from the mobile information terminal in which an event has occurred based on the event that has occurred in the mobile information terminal. Hence, the post information can automatically be posted from the mobile information terminal. According to this, the quality (freshness) and quantity of post information held by the information management device are enhanced, and convenience of the mobile information terminal which utilizes the post information is also enhanced.

The post information, which has been posted together with the location information, preferably includes information that has been posted by a terminal device connected to the information management device through a public network.

According to such a configuration, the information management device can provide the mobile information terminal with post information accumulated in a server or the like connected to the information management device through a public network such as the Internet. Hence, post information that is provided from the information management device to the mobile information terminal is based on one or more pieces of post information possessed by a plurality of servers or the like connected to a public network. Therefore, the number of pieces of post information that can be provided to the mobile information terminal from the information management device is automatically increased. Hence, convenience of the mobile information terminal which utilizes the post information is also enhanced.

The mobile information terminal is preferably a vehicle-mountable information terminal mounted in a vehicle.

According to such a configuration, also in a vehicle that has a fast moving speed and is required to efficiently collect information, the mobile information terminal displays post information on the map information. Hence, the mobile information terminal can provide a user such as a driver of a vehicle with newer information.

Especially, if the mobile information terminal uses a driving speed of a vehicle in which that mobile information terminal is mounted as an event (parameter) that triggers automatic sending of post information, a display device can display, in a superposed manner, traffic jam information about a road in the vicinity posted from another mobile information terminal in real time. Hence, the mobile information terminal can provide information and the like that are effective for driving.

The mobile information terminal preferably further includes a function for converting the post information from voice data into character data and sending the converted post information to the information management device.

According to such a configuration, even a user during driving a vehicle, who cannot easily input information by means of characters, can input post information to the mobile information terminal by voice. According to this, posting of post information at a high real time level from the mobile information terminal is facilitated, and quantity and quality of post information accumulated in the information management device are enhanced. Hence, convenience of the mobile information terminal, which utilizes the post information, is further enhanced.

Further, since users of the mobile information terminals are limited, voice-character conversion is suitably adapted to voices of the limited users, and voice data input to the mobile information terminal can be converted into character data. Hence, precise voice-character conversion can also be carried out.

To achieve the foregoing objective, the present invention provides an information management device provided in a management center, which manages delivery and reception of information between a plurality of mobile information terminals through wireless communication. The information management device includes a post information management unit and a delivery control unit. The post information management unit receives location information and post information posted from the mobile information terminals, and associates the received location information and the post information with each other and manages the location information and the post information. In response to a request from any of the mobile information terminals, the delivery control unit selects the managed location information and the managed post information that correspond to the request. To allow a display device of the mobile information terminal that has sent the request to display, in a superposed manner, the selected post information on a location of a map information indicated by the selected location information, the delivery control unit delivers the selected location information and the selected post information to the mobile information terminal that has sent the request.

According to this configuration, since the location information is associated with the post information, the mobile information terminal can display the post information on the map information of the mobile information terminal based on this location information. Since the location information is associated with the post information as described above, the mobile information terminal can flexibly display the post information on any location on the map information without being constrained by facilities or the like on the map. Further, since constraints of the location information associated with the post information are reduced, posting of the post information is facilitated and therefore, convenience of the mobile information terminal, which utilizes the post information, is also enhanced. Especially according to this configuration, since the information management device handles the location information indicated as a location on the map information of the mobile information terminal, control of the mobile information terminal for displaying the post information on the map information of the mobile information terminal becomes easy.

The mobile information terminal displays post information on the map information of the mobile information terminal in a superposed manner. Thus, even if post information is irregularly given to the mobile information terminal, it becomes possible to reliably provide a user with information at a high real time level showing that the corresponding post information exists in map information that is being displayed. According to this, the mobile information terminal can easily renew not only post information having been accumulated in the information management device from long time ago but also post information accumulated in the information management device at the last minute into newer information to be displayed on the map information in a superposed manner. Such new information is effective for a user utilizing this information to ascertain the current traffic situation or to ascertain ongoing events around the region.

Further, the information management device selects post information and location information that are delivered to a mobile information terminal in response to a request from that mobile information terminal. Hence, the information management device can suitably provide the mobile information terminal with post information that is required by a mobile information terminal. For example, to a request of information from a mobile information terminal based on current location information of that mobile information terminal, the information management device delivers information (post information) around a current location of a requester's mobile information terminal. In addition, when contents of information requested by a mobile information terminal of the requester could be specified, the information management device delivers information that matches the specific contents to the mobile information terminal of the requester in addition to the current location information of the mobile information terminal of the requester.

Although the information management device manages post information that is posted from the mobile information terminal, a poster that posts post information is a mobile information terminal, and the information management device is not an originator of the post information. Therefore, maintenance management concerning production of the post information and guarantee of credibility of post information becomes easy.

The information management device preferably receives, as information that is based on an operation of a user of the mobile information terminal, the post information posted together with the location information.

According to such a configuration, post information is posted to the information management device by a user's operation of the mobile information terminal. From this configuration, the information management device can receive post information associated with location information of an information management device different from a requester who requests post information from a mobile information terminal different from the requester. According to this, the information management device can manage post information from various mobile information terminals together with location information. A user of any mobile information terminal can easily post the post information including location information of the mobile information terminal of the poster to the information management device.

The post information posted together with the location information preferably includes information that has been automatically sent from the mobile information terminal based on an event that has occurred in the mobile information terminal.

According to such a configuration, post information is automatically sent to the information management device from the mobile information terminal in which an event has occurred based on the event. Hence, the post information can automatically be posted from the mobile information terminal to the information management device. According to this, quality (freshness) and quantity of post information held by the information management device or the like are enhanced, and convenience of the mobile information terminal, which utilizes the post information, is also enhanced.

A terminal device is preferably connected to the information management device through a public network, and the location information and the post information managed by the post information management unit preferably include information that has been posted by the terminal device connected to the public network.

According to such a configuration, the information management device can provide the mobile information terminal with post information accumulated in a server or the like connected to the information management device through a public network such as the Internet. Hence, post information that is provided from the information management device to the mobile information terminal is based on one or more post information possessed by a plurality of servers or the like connected to a public network. Therefore, the number of pieces of post information that can be provided to the mobile information terminal from the information management device is automatically increased. Hence, convenience of the mobile information terminal, which utilizes the post information, is also enhanced.

Although post information with which location information matching map information of the mobile information terminal is not associated may be included among post information that are accumulated in a server or the like in some cases, the information management device can associate location information that matches map information of the mobile information terminal with such post information also. Even if location information that is sent to the information management device as a request from the mobile information terminal cannot be used for retrieving post information accumulated in a server or the like, the information management device can use such location information for retrieving post information by converting the location information into location information that matches map information of the mobile information terminal.

The mobile information terminal is preferably a vehicle-mountable information terminal mounted in a vehicle.

According to such a configuration, also in a vehicle that has a fast moving speed and is required to efficiently collect information, the mobile information terminal displays post information on the map information. Hence, the mobile information terminal can provide a user such as a driver of a vehicle with newer information.

Especially, if the mobile information terminal uses a driving speed of a vehicle that is provided with that mobile information terminal as an event (parameter) that triggers automatic sending of post information, a display device can display, in a superposed manner, traffic jam information about a road in the vicinity posted from another mobile information terminal in real time. Hence, the mobile information terminal can provide information and the like which are effective for a driving operation.

The information management device preferably further includes a function for converting the post information received together with the location information from voice data into character data and managing the converted post information.

According to such a configuration, even a user during driving a vehicle, who cannot easily input information by means of characters, can input post information to the mobile information terminal by voice. According to this, posting of post information at a high real time level from the mobile information terminal is facilitated, and quantity and quality of post information accumulated in the information management device are enriched. Hence, convenience of the mobile information terminal, which utilizes the post information, is further enhanced. Further, since the voice-character conversion processing having a relatively high processing load is carried out by the information management device, a processing load of the mobile information terminal can be lowered. Although the information management device has a high processing load, precise voice-character conversion processing can be executed.

To achieve the foregoing objective, the present invention provides an information management system for mobile information terminals including a plurality of mobile information terminals and an information management device provided in a management center that manages delivery and reception of information between the mobile information terminals through wireless communication. The information management device includes a post information management unit and a deliver control unit. The post information management unit receives location information and post information posted from any of the mobile information terminals, and associates the received location information and the received post information with each other and manages the location information and the post information. In response to a request from any of the mobile information terminals, the delivery control unit selects the managed location information and the managed post information that correspond to the request, and which controls delivery of the selected location information and the selected post information to the mobile information terminal that has sent the request. The mobile information terminal that has requested delivery of the post information is configured to acquire the location information and the post information that have been associated with each other and delivered from the information management device, and to control a displaying manner of a display device such that the acquired post information is displayed, in a superposed manner, on a location of a map information indicated by the acquired location information.

According to this configuration, since the location information is associated with the post information, the mobile information terminal can display the post information on the map information of the mobile information terminal based on this location information. Since the location information is associated with the post information as described above, the mobile information terminal can flexibly display the post information on any location on the map information without being constrained by facilities or the like on the map. Further, since constraints of the location information associated with the post information are reduced, posting of the post information is facilitated and therefore, convenience of the mobile information terminal, which utilizes the post information, is also enhanced. Especially according to this configuration, since the information management device handles the location information indicated as a location on the map information of the mobile information terminal, control of the mobile information terminal for displaying the post information on the map information of the mobile information terminal becomes easy.

The mobile information terminal displays post information on the map information of the mobile information terminal in a superposed manner. Thus, even if post information is irregularly given to the mobile information terminal, it becomes possible to reliably provide a user with information at a high real time level showing that the corresponding post information exists in map information that is being displayed. According to this, the mobile information terminal can easily renew not only post information accumulated in the information management device from long time ago but also post information accumulated in the information management device at the last minute into newer information to be displayed on the map information in a superposed manner. Such new information is effective for a user utilizing this information to ascertain the current traffic situation or to ascertain ongoing events in the region.

Further, the information management device selects post information and location information that are delivered to a mobile information terminal in response to a request from that mobile information terminal. Hence, the information management device can suitably provide the mobile information terminal with post information that is required by a mobile information terminal. For example, to a request of information from a mobile information terminal based on current location information of that mobile information terminal, the information management device delivers information (post information) around a current location of a requester's mobile information terminal. In addition, when contents of information requested by a mobile information terminal of the requester could be specified, the information management device delivers information that matches the specific contents to the mobile information terminal of the requester in addition to the current location information of the mobile information terminal of the requester.

Although the information management device manages post information that is posted from the mobile information terminal, a poster who posts post information is a mobile information terminal, and the information management device is not an originator of the post information. Therefore, maintenance management concerning production of the post information and security of credibility of post information becomes easy.

The information management device preferably receives, as information that is based on an operation of a user of any of the mobile information terminals, the post information posted together with the location information.

According to such a configuration, post information is posted to the information management device by a user's operation of the mobile information terminal. From this configuration, the information management device can receive post information associated with location information of an information management device different from a requester who requests post information from a mobile information terminal different from the requester. According to this, the information management device can manage post information from various mobile information terminals together with location information. A user of any mobile information terminal can easily post information including location information of the mobile information terminal of the poster to the information management device.

The post information posted to the information management device together with the location information preferably includes information that has been automatically sent from the mobile information terminal based on an event that has occurred in the mobile information terminal.

According to such a configuration, post information is automatically sent to the information management device from the mobile information terminal in which an event has occurred based on the event. Hence, the post information can automatically be posted from the mobile information terminal to the information management device. According to this, quality (freshness) and quantity of post information held by the information management device are enhanced, and convenience of the mobile information terminal, which utilizes the post information, is also enhanced.

A terminal device is preferably connected to the information management device through a public network, and the location information and the post information managed by the post information management unit preferably include information posted by the terminal device connected to the public network.

According to such a configuration, the information management device can provide the mobile information terminal with post information accumulated in a server or the like connected to the information management device through a public network such as the Internet. Hence, post information that is provided from the information management device to the mobile information terminal is based on one or more post information possessed by a plurality of servers or the like connected to a public network. Therefore, the number of pieces of post information that can be provided to the mobile information terminal from the information management device is automatically increased. Hence, convenience of the mobile information terminal, which utilizes the post information, is also enhanced.

Although post information with which location information matching map information of the mobile information terminal is not associated may be included among post information accumulated in a server or the like in some cases, the information management device can associate location information that matches map information of the mobile information terminal with such post information also. Even if location information that is sent to the information management device as a request from the mobile information terminal cannot be used for retrieving post information accumulated in a server or the like, the information management device can use such location information for retrieving post information by converting the location information into location information that matches map information of the mobile information terminal.

The mobile information terminals are preferably vehicle-mountable information terminals each mounted in one of a plurality of vehicles.

According to such a configuration, also in a vehicle that has a fast moving speed and is required to efficiently collect information, the mobile information terminal displays post information on the map information. Hence, the mobile information terminal can provide a user such as a driver of a vehicle with newer information.

Especially, if the mobile information terminal uses a driving speed of a vehicle in which that mobile information terminal is mounted as an event (parameter) that triggers automatic sending of post information, a display device can display, in a superposed manner, traffic jam information about a road in the vicinity posted from another mobile information terminal in real time. Hence, the mobile information terminal can provide effective information for a driving operation and the like.

Each of the mobile information terminals preferably includes a function for converting the post information from voice data into character data and sending the converted post information to the information management device.

According to such a configuration, even a user during driving a vehicle, who cannot easily input information by means of characters, can input post information to the mobile information terminal by voice. According to this, posting of post information at a high real time level from the mobile information terminal or the like is facilitated, and quantity and quality of post information accumulated in the information management device are enriched. Hence, convenience of the mobile information terminal, which utilizes the post information, is further enhanced.

Further, since users of the mobile information terminals are limited, voice-character conversion is suitably adapted to voices of the limited users, and voice data that is input to the mobile information terminal can be converted into character data. Hence, precise voice-character conversion can also be carried out.

The post information management unit preferably further includes a function for converting the post information received together with the location information from voice data into character data and managing the converted post information.

According to such a configuration, even a user during driving a vehicle, who cannot easily input information by means of characters, can input post information to the mobile information terminal by voice. According to this, posting of post information at a high real time level from the mobile information terminal is facilitated, and quantity and quality of post information accumulated in the information management device are enriched. Hence, convenience of the mobile information terminal, which utilizes the post information, is further enhanced. Further, since the voice-character conversion processing having a relatively high processing load is carried out by the information management device, a processing load of the mobile information terminal can be lowered. Although the information management device has a high processing load, precise voice-character conversion processing can be executed.

The vehicle preferably includes a detection means for detecting change in a driving environment of the vehicle and a communication means for automatically sending information indicative of the change in the driving environment detected by the detection means to the information management device together with location information of the vehicle. The information management device preferably further includes a weighting means for weighting the post information and the location information based on a combination of information that has been automatically sent from the communication means and information posted through the mobile information terminal. The delivery control unit preferably preferentially delivers the post information and the location information having high priorities based on the weighting to a mobile information terminal that requests delivery of the post information.

According to such a configuration, the information management device weights post information based on a combination of: information including location information and post information that are automatically sent from the communication means; and information posted through the mobile information terminal. According to this, the information management device can provide post information with priority. In the case of post information for which it is generally difficult to provide priority because of their lacks of regularity, this configuration makes it possible to provide such post information with priority, and the information management device delivers post information and location information to the mobile information terminal based on the priority. Hence, convenience of the mobile information terminal, which utilizes post information in which the priority is taken into consideration, is further enhanced.

For example, the information management device sets information having a low accuracy level to low priority and information having a high accuracy level to high priority. According to this, it is possible to enhance accuracy of post information provided by the mobile information terminal.

BRIEF DESCRIPTION OF THE DRAWINGS

FIG. 8 is a schematic diagram showing a manner of information posting of the information management system for mobile information terminals shown in FIG. 7;

FIG. 9 is a list of priorities, which are set for information posted to the manager center shown in FIG. 7;

FIG. 10 is a schematic diagram showing an operation example of the information management system for mobile information terminals shown in FIG. 7;

MODES FOR CARRYING OUT THE INVENTION (First Embodiment)

An information management system for mobile information terminals according to a first embodiment of the present invention is embodied will be described in accordance with FIG. 1.

Figure 1:
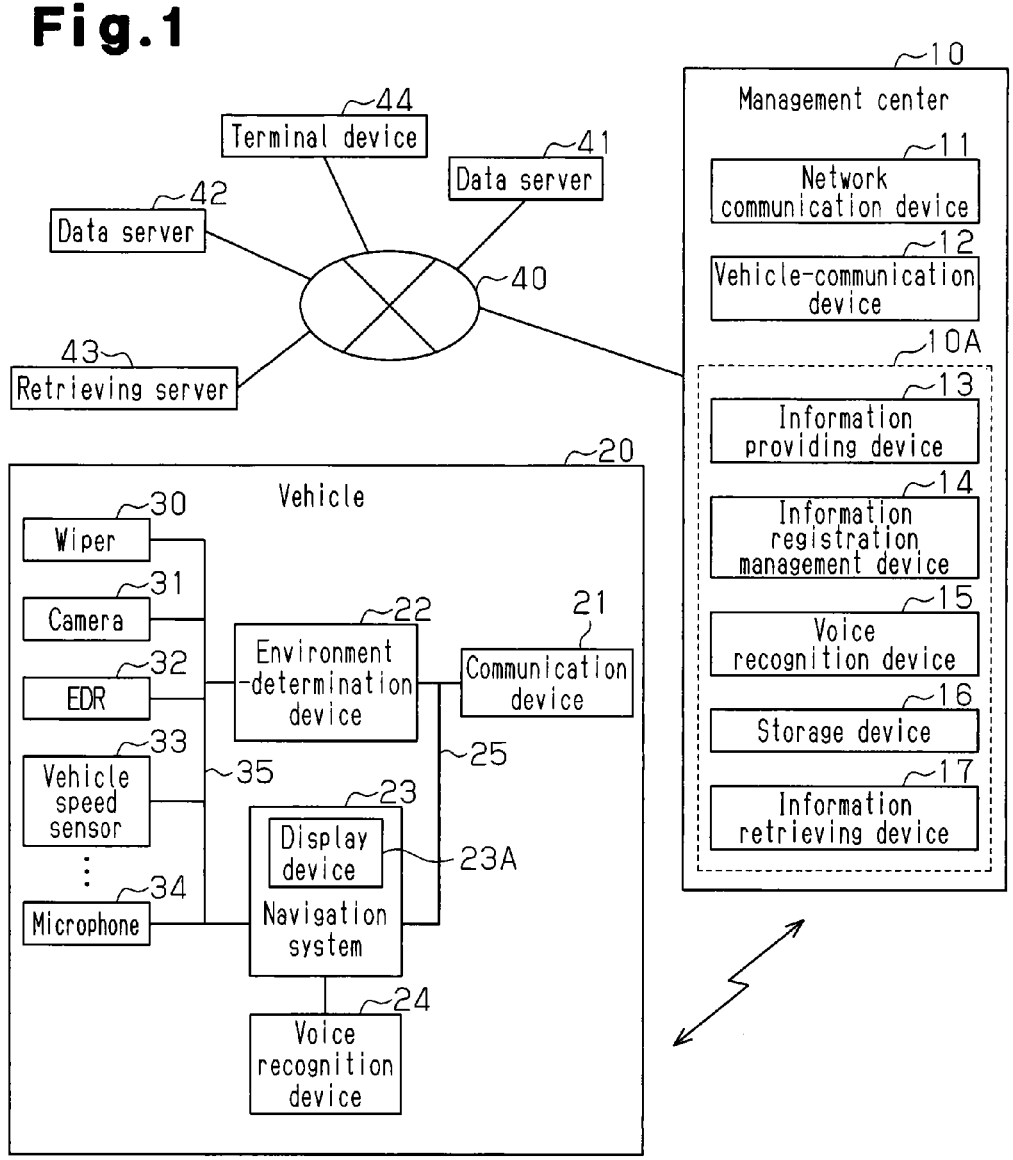
FIG. 1 is a schematic diagram showing an outline configuration of an information management system for mobile information terminals according to a first embodiment of the present invention is embodied.

As shown in FIG. 1, the information management system for mobile information terminals includes an information management device 10A provided in a management center 10 and a navigation system 23 configuring a mobile information terminal mounted in a vehicle 20. In this embodiment, a relationship between the one vehicle 20 and the management center 10 will first be described, but the invention is also applied to an aspect in which a plurality of vehicles 20 communicate with one management center 10 as will be described later. The navigation system 23 can wirelessly communicate with the information management device 10A. An external public network 40 such as the Internet is connected to the management center 10 so that data can be sent to and received from the management center 10.

The public network 40 is the Internet. Connected to the public network 40 are data servers 41 and 42, which hold various kinds of information including post information posted (uploaded) by a user, and a retrieving server 43, which retrieves information matching a designated keyword from various kinds of information including post information that can be accessed from the public network 40. A terminal device 44 such as a mobile phone and a personal computer from which information is posted to the data servers 41 and 42 through the public network 40 is also connected to the public network 40.

Since the management center 10 is for providing the vehicle 20 of user who wishes with service of the management center 10, only a vehicle 20 of a user who has an access authority can access the management center 10. According to this configuration, the management center 10 cannot be accessed neither from a vehicle of a user who does not have an access authority nor through the public network 40 by a user having no access authority. In this embodiment, it is assumed that the vehicle 20 can access the management center 10.

The management center 10 includes the information management device 10A, a network communication device 11, which performs data-communication with the public network 40, and a vehicle-communication device 12, which performs mutual and wireless data communication with the vehicle 20. The information management device 10A provides service concerning post information that is voluntarily posted by a user as information that is not managed by facilities. That is, the information management device 10A receives and holds post information that is posted from the vehicle 20 for example, and delivers, to the vehicle 20, post information that matches a request from the navigation system 23 of the vehicle 20.

The information management device 10A includes an information providing device 13 as a delivery control unit, which delivers post information or the like to the vehicle 20, and an information registration management device 14 as a post information management unit, which acquires post information or the like voluntarily posted by a user of the vehicle 20 or the like and manages its registration. The information management device 10A includes a center voice recognition device 15, which carries out a voice-character conversion for converting voice data to character data, and a storage device 16, in which acquired post information is stored. The information management device 10A further includes an information retrieving device 17 capable of retrieving post information that matches retrieval conditions from post information stored in the storage device 16 or post information that can be accessed from the public network 40. The information management device 10A and the vehicle 20 are set such that sharing of location information between the information management device 10A and the vehicle 20 is maintained at a high level by utilizing same location information of the same specifications both by the information management device 10A and by the vehicle 20, e.g., location information of specifications used for map information of the navigation system 23 for example.

The information providing device 13, the information registration management device 14, the center voice recognition device 15 and the information retrieving device 17 are respectively provided with arithmetic device (not shown) mainly including microcomputers. That is, each of the microcomputers is provided with the arithmetic device, a storage device, a nonvolatile memory (ROM) and a volatile memory (RAM), and various kinds of information processing operations based on various kinds of data and programs stored in the storage device and the respective memories are executed by the microcomputer. Alternatively, some of the information providing device 13, the information registration management device 14, the center voice recognition device 15 and the information retrieving device 17 may use one microcomputer in common.

The network communication device 11 is connected to the public network 40 through a wired line or a wireless link, and the network communication device 11 enables data communication between the management center 10 and the data servers 41 and 42 or the retrieving server 43 connected to the public network 40.

The vehicle-communication device 12 enables various kinds of data communications including post information and location information between the management center 10 and the vehicle 20. By this data communication, the management center 10 receives post information sent from the vehicle 20 or a delivery request by a user from the vehicle 20 requesting delivery of post information that matches retrieval conditions designated by a user of the vehicle 20 from the management center 10 to vehicle 20, and also sends post information that matches the deliver request to the vehicle 20.

The information providing device 13 receives, from the vehicle 20 through the vehicle-communication device 12, a delivery request including retrieval conditions of post information that a user wishes to utilize, and then makes the information retrieving device 17 retrieve and acquire post information that matches retrieval conditions included in the delivery request in the storage device 16 or on the public network 40. The retrieval condition received by the information providing device 13 from the vehicle 20 for retrieving the post information includes at least one of location information indicative of a specific location such as a driving destination of the vehicle 20, the current location information of the vehicle 20, and keyword information concerning contents of post information. If the information providing device 13 acquires post information that matches post information designated by the user of the vehicle 20 in the storage device 16 or on the public network 40, the information providing device 13 provides the vehicle 20 with the acquired post information through the vehicle-communication device 12.

The information registration management device 14 receives post information posted in the vehicle 20 and location information matching that post information from the vehicle 20 through the vehicle-communication device 12, and confirms whether the received location information is associated with the received post information. If it is not associated, the information registration management device 14 associates the location information with the post information. The post information and the location information are associated with each other by combining the post information and the location information into one file, by storing the post information and the location information with file names capable of identifying the association therebetween, or by registering the post information and the location information in an associating list stored in the storage device 16 to be associated with each other. In this manner, the information management device 10A can manage the received post information to be associated with the location information.

When post information posted from the vehicle 20, post information acquired from data servers 41 and 42 on the public network 40 and the like are voice data, the center voice recognition device 15 carries out voice-character conversion for converting the voice data to character data. In order that the vehicle 20 displays post information that is delivered from the management center 10 on map information of a display device 23A in the navigation system 23 in a superposed manner, the center voice recognition device 15 is used for bringing the post information delivered from the management center 10 into information including character data. In addition, when a user of the vehicle 20 gives an instruction to the management center 10 by voice or the like, the center voice recognition device 15 is used for identifying the instruction contents by the voice of the user.

The storage device 16 is a known storage device capable of reading and writing from and to the devices 13 to 15 and 17 of the information management device 10A. The storage device 16 holds post information from the vehicle 20, location information associated with that post information, a delivery request of post information from the vehicle 20, the retrieval condition of post information and the like.

The information retrieving device 17 retrieves post information satisfying retrieval conditions including location information and keyword from post information stored in the storage device 16, and acquires a retrieval result. The information retrieving device 17 retrieves post information stored in the data servers 41 and 42 of the public network 40 by its own retrieving function based on the retrieval condition including the location information and the keyword, and acquires a retrieval result. Further, the information retrieving device 17 provides the retrieving server 43 of the public network 40 with the retrieval condition including the location information and the keyword, thereby making the retrieving server 43 retrieve post information and the like stored in the data servers 41 and 42, and acquire a retrieval result from the retrieving server 43. When specifications of location information on the public network 40 and specifications of location information used by the information management device 10A are different from each other, the information retrieving device 17 mutually converts specifications of the location information used by the information management device 10A and specifications of the location information on the public network 40. According to this conversion, when the information retrieving device 17 retrieves post information satisfying retrieval conditions using location information on the public network 40, the information retrieving device 17 converts specifications of location information of the management center 10 into specifications of the location information on the public network 40. On the contrary, the information retrieving device 17 converts specifications of location information acquired from the public network 40 into specifications of location information of the management center 10. The information retrieving device 17 acquires post information and location information corresponding to that post information from the retrieval result.

The vehicle 20 includes a vehicle-mountable communication device 21 for wireless communication with the management center 10, a environment-determination device 22 as communication means to be connected to the vehicle-mountable communication device 21 through a vehicle-mountable network 25 for data communication, and the navigation system 23 as communication means. In this embodiment, the environment-determination device 22 and the navigation system 23 configure the mobile information terminal mounted in the vehicle 20. Although the environment-determination device 22 and the navigation system 23 are described separately in this embodiment, the environment-determination device 22 may integrally be incorporated in the navigation system 23, i.e., the navigation system 23 may include an automatically posting function. The vehicle 20 includes a wiper 30, a vehicle-mountable camera 31, an event data recorder (EDR) 32, a vehicle speed sensor 33 and a vehicle-mountable microphone 34 as detecting means connected to the environment-determination device 22 and the navigation system 23 through a vehicle-mountable network 35 for data communication. The vehicle-mountable networks 25 and 35 can utilize known networks such as CAN (Controller Area Network), Ethernet (registered trade name) and FlexRay (registered trade name). The vehicle-mountable networks 25 and 35 may be separate vehicle-mountable networks or may be the same vehicle-mountable network. As connection between the devices 21 to 23 and 30 to 34 of the vehicle 20, it is possible to employ connection other than network connection, e.g., serial connection, as long as data communication of necessary information can be carried out. The devices 21 to 23 and 30 to 34 may be connected to one another through a radio line or a wired line.

Since the wiper 30 includes an integrated wiper ECU, which control operation of the wiper 30, the wiper 30 outputs operation data such as information about a state of the wiper 30, information concerning whether the wiper 30 is operating, and an operation speed of the wiper 30 during operation.

Since the vehicle-mountable camera 31 includes an integrated camera ECU, which control operation of the vehicle-mountable camera 31, the vehicle-mountable camera 31 outputs image data of a shot image around the vehicle 20 that is captured by the vehicle-mountable camera 31.

The EDR 32 is a device for recording data that are input from the vehicle speed sensor 33 mounted in the vehicle 20 and various kinds of other sensors (not shown), and records the data, which are input from the various kinds of sensors under a predetermined condition.

Since the vehicle speed sensor 33 includes an integrated sensor ECU, which controls a detecting unit for detecting a vehicle speed, the vehicle speed sensor 33 outputs a vehicle speed data based on a speed of the vehicle 20.

The vehicle-mountable microphone 34 is provided within the vehicle 20 for collecting (recording) voice of a user, especially a driver. Since the vehicle-mountable microphone 34 includes an integrated ECU, which output a collected voice to the vehicle-mountable network 35, the vehicle-mountable microphone 34 outputs voice data including the collected voice.

The environment-determination device 22 and the navigation system 23 are respectively provided with arithmetic devices (not shown) mainly including microcomputers. That is, each of the microcomputers is provided with the arithmetic device, a storage device, a nonvolatile memory (ROM), a volatile memory (RAM) and the like, and various kinds of information processing operations based on various kinds of data and programs stored in the storage device and the memories are executed by the microcomputer. Alternatively, the environment-determination device 22 and the navigation system 23 may use one microcomputer in common.

The environment-determination device 22 determines a surrounding environment of the vehicle 20 based on vehicle information such as operation data, image data, vehicle speed data and voice data acquired from these devices 30 to 34 through the vehicle-mountable network 35. For example, the environment-determination device 22 senses weather based on operation data of the wiper 30, recognizes the surrounding environment of the vehicle based on image data, and determines a traffic situation such as presence or absence of traffic jams and time required to reach a destination from the current driving location of the vehicle 20. Information such as steering angle, acceleration and deceleration of the vehicle 20, a thermometer, a hygrometer, barometer and the like may be input to the environment-determination device 22 from various kinds of sensors (not shown), or location information and map information may be input to the environment-determination device 22 from the navigation system 23. The environment-determination device 22 determines an environment of the vehicle 20 and its surrounding environment based on these input information.

In accordance with a result of determination based on data from the devices 30 to 34, the environment-determination device 22 determines whether the determination result and the data should be voluntarily and automatically posted to the information management device 10A. Hence, the environment-determination device 22 includes a threshold value for determining whether information should be posted in accordance with determination results. Based on a determination result that satisfies conditions, such as a result exceeding the threshold value, the environment-determination device 22 voluntarily and automatically posts these determination results and information indicative of the data as post information to the management center 10, together with the current location information of the vehicle 20 (information indicative of the current location of the vehicle 20). For example, if the environment-determination device 22 determines from operation data of the wiper 30 that the wiper 30 is continuously operating, the environment-determination device 22 automatically posts post information of "raining" to the information management device 10A together with the current location information of the vehicle 20. Thereafter, if the environment-determination device 22 detects from the operation data of the wiper 30 that the continuous operation of the wiper 30 stops, the environment-determination device 22 automatically posts post information of "rain has stopped" to the information management device 10A together with location information. Further, if the environment-determination device 22 detects that the value of the vehicle speed data is continuously varied in a low speed state for example, the environment-determination device 22 automatically posts post information that "the road is jammed" to the information management device 10A together with the location information. On the other hand, when the value of the vehicle speed data returns to a normal driving speed from the low speed, the environment-determination device 22 automatically posts post information of "the vehicle 20 has got out of a traffic jam" to the information management device 10A together with location information. Further, if the environment-determination device 22 receives abnormal information from vehicle-mountable devices and the like connected to the vehicle-mountable network 35, the environment-determination device 22 automatically posts post information that a malfunction has occurred in the vehicle-mountable device to the information management device 10A together with the current location information of the vehicle 20.

The navigation system 23 detects the current location of the vehicle 20 by utilizing a GPS (Global Positioning System, not shown) or the like. The navigation system 23 refers to map information stored in the memory based on the detected current location of the vehicle 20, to give a driver or the like a guide for a driving route of the vehicle 20 to a driving destination by displaying the route as an image by the display device 23A or guiding the driver or the like by voice from a speaker (not shown).

An image display function of the display device 23A is controlled by the navigation system 23, and the display device 23A displays character information and image information transmitted from the navigation system 23 as characters or image under display control by the navigation system 23. The navigation system 23 can output data such as current location of the vehicle 20 and map information to the vehicle-mountable communication device 21 through the vehicle-mountable network 25 as needed.

The navigation system 23 includes various kinds of operation switches for providing a user with a navigation function, a character input function used for selecting a destination, a function for moving a cursor so that a user can select from alternatives displayed on the screen of the display device 23A, and an input function, such as a touch panel provided on the screen of the display device 23A, through which an operation of a user is input.

In this embodiment, the navigation system 23 includes posting function for posting post information to the management center 10 based on a user's operation. A user uses the input function provided by the navigation system 23, thereby inputting post information to be posted to the management center 10 as character information. Of location information on the map information of the navigation system 23, location information corresponding to the post information is associated by the navigation system 23 with that post information, which is input by a user. The navigation system 23 associates location information with post information such that a user first designates a target location on the map information displayed on the display device 23A and then the user inputs post information to the target location, or the user designates a target location on map information that is wished by the user to be associated with the input post information. In this manner, the navigation system 23 associates location information used for map information of the navigation system 23 with post information. Since location information handled by the navigation system 23 is location information used as map information of the navigation system 23, specifications of location information that is associated with post information by the navigation system 23 according to a user's designation are the same as specifications of location information used for map information of the navigation system 23. Specifications of location information that is acquired by the environment-determination device 22 from the navigation system 23 when the environment-determination device 22 automatically posts post information and then is associated with the post information are also the same as specifications of location information used for map information of the navigation system 23.

Further, the navigation system 23 includes a function for inquiring the management center 10 for information based on an operation of a user. For example, a user can inquire the management center 10 for detailed information concerning facilities on the map information displayed on the display device 23A by operating the navigation system 23. The navigation system 23 can inquire the management center 10 for information of the environment of the driving location as retrieval conditions of a current driving location of the vehicle 20, or using a keyword to be added to the retrieval condition, can inquire the management center 10 for information (post information) which matches that retrieval condition. Further, to newly obtain information of the environment of the driving location of the vehicle 20 whenever the vehicle 20 moves, the navigation system 23 can appropriately send the current location information of the vehicle 20 to the management center 10. In this case, the navigation system 23 calculates the current location information of the vehicle 20 based on a vehicle speed, a travel distance, or time and distance interval provided based on a predetermined time interval and the like with respect to the vehicle 20, and appropriately sends the calculated current location information to the management center 10.

The navigation system 23 of the embodiment displays map information on the display device 23A, and can display a display image, balloon images (see balloon images 231 and 232 in FIG. 2) at any location of the map information displayed by the display device 23A in a superposed manner such as to cover and hide the displayed map information (image of map). Although the balloon image temporarily hides the map information behind an image, the balloon image is displayed on a screen at a location that does not influence the display of the map information displayed by the display device 23A. Therefore, after the balloon image disappears, the map information that has been hidden by the balloon image is again displayed by the display device 23A. Location information on the map information of the navigation system 23 is associated with the balloon image. Thus, if location information associated with post information is included within map information that is currently displayed by the display device 23A, the navigation system 23 displays the balloon image at a corresponding location on the map information that is being displayed by the display device 23A. On the other hand, if location information of a balloon image is not included within map information that is being displayed by the display device 23A, the balloon image is not displayed on the map information that is being displayed by the display device 23A.

A vehicle-mountable voice recognition device 24 can form post information including character data as needed by converting voice data of a user that is input from the vehicle-mountable microphone 34 into character data. The navigation system 23 can utilize post information including character data as it is for retrieving as a keyword or as an image that can be displayed on the display device 23A in a superposed manner. In addition to the conversion of contents of a user's voice into character data for inputting post information, the vehicle-mountable voice recognition device 24 can carry out voice-character conversion. That is, when a user operates the navigation system 23 by speaking for utilizing the navigation function, the vehicle-mountable voice recognition device 24 may be used for converting instruction contents by voice of the user into character data to discriminate the instruction contents.

The vehicle-mountable communication device 21 is a vehicle-mountable wireless communication device, which enables wireless communication between the management center 10 and the environment-determination device 22 or the navigation system 23. The vehicle-mountable communication device 21 sends, to the management center 10, post information, location information and information concerning an inquiry for retrieval conditions and the like output from the environment-determination device 22 or the navigation system 23 toward the management center 10. The vehicle-mountable communication device 21 receives various kinds of information such as post information sent from the management center 10 to the vehicle 20, and transmits the information to the navigation system 23. Hence, the navigation system 23 functions as an information acquiring unit, which acquires, from the information management device 10A possessed by the management center 10 through wireless communication, location information and post information that are posted to the management center 10 in a state where the location information and the post information are associated with each other.

Next, information providing service provided to the vehicle 20 from the management center 10 will be described with reference to FIGS. 2 and 3

Figure 2:
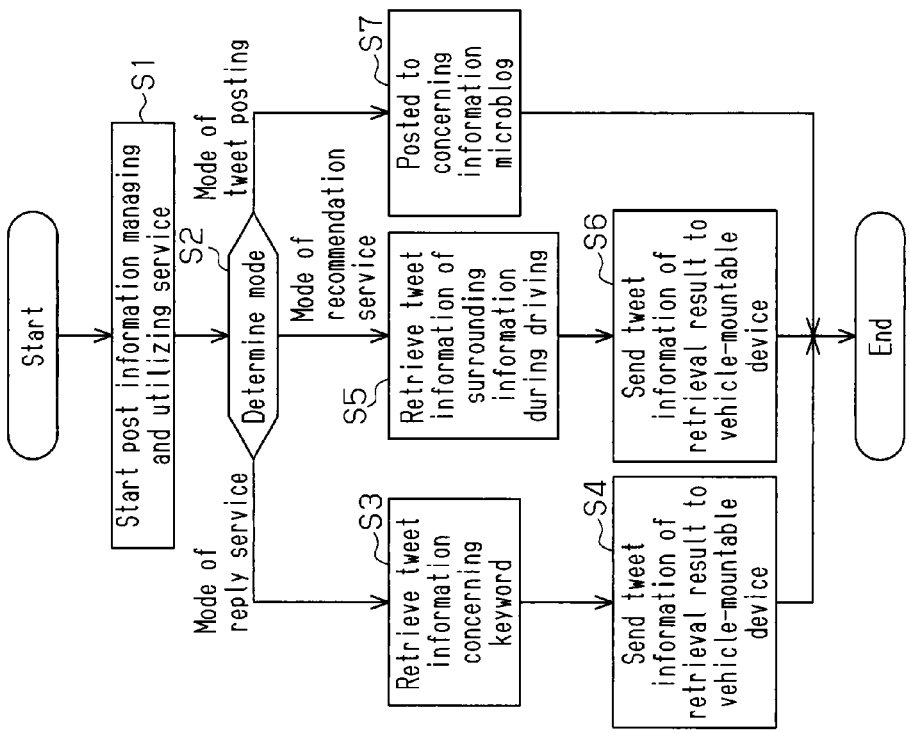
FIG. 2 is a conceptual diagram showing a manner of information processing of the information management system for mobile information terminals shown in FIG. 1.

As shown in FIG. 2, the data server 41 connected to the public network 40 provides service of a "tweet-type microblog" 410 as an interface for receiving and publishing post information posted by a user. The data server 41 stores and holds post information that is posted through this service. The tweet-type microblog 410 is implemented by known services such as microblog such as Twitter and blogs to provide microblogs of information of various fields (categories) such as traffic jams, facilities, scenery, weather and restaurants, which a user is likely to wish to learn during driving of a vehicle.

The other data server 42 connected to the public network 40 stores and holds post information that is posted by a user as "tweet information" 420.

The information management device 10A of the management center 10 provides post information managing and utilizing service 200 ("tweet town navigation" service) for a user of the vehicle 20. The post information managing and utilizing service 200 holds post information from a user of the vehicle 20 and post information that is voluntarily posted from the vehicle 20 or the like to be associated with location information. Further, in accordance with a delivery request from a user of the vehicle 20, the post information managing and utilizing service 200 delivers, to a vehicle 20 of a requester, post information that matches a retrieval condition included in the delivery request. More specifically, to answer a user's concerned question, the post information managing and utilizing service 200 includes a reply service 210 ("tell-me town navigation" service) for checking post information with association to location information and replying the resulting post information to the vehicle 20, and a recommendation service 230 ("leave-it-to-me town navigation" service) for timely providing information in which a user is likely to have an interest in accordance with the current location information of the vehicle 20. Further, the post information managing and utilizing service 200 includes posting service 220 ("tweet posting" service) for receiving post information that is voluntarily posted by a user of the vehicle 20, and for storing and holding the received post information with association to location information. The posting service 220 stores received post information in the storage device 16, and posts (uploading) the received post information to a microblog of a corresponding field among several tweet-type microblogs (not shown) provided by the posting service 220. Further, through the posting service 220, it is possible to post stored post information to the tweet-type microblog 410 of a corresponding field, and to store the post information in the data server 42 as the tweet information 420.

The reply service 210 is suitably utilized when a user such as a driver inquires the management center 10 for a matter of user's concern or information that the user wishes to learn during driving of the vehicle. When the reply service 210 is implemented, the navigation system 23 sends, from the vehicle 20 to the management center 10 as inquiry information, retrieval conditions including a keyword or location information that is input by user's operation. If the information providing device 13 receives retrieval conditions from the vehicle 20, the information providing device 13 makes the information retrieving device 17 retrieve post information using the keyword or location information included in the retrieval conditions. The information retrieving device 17 retrieves post information that matches the retrieval conditions from the storage device 16 or the data servers 41 and 42 connected to the public network 40, and outputs the post information acquired as a result of the retrieving to the information providing device 13. The information providing device 13 provides (delivers) the vehicle 20 with the post information that is input from the information retrieving device 17 together with location information. The display device 23A of the navigation system 23 displays the delivered post information (e.g., POI (Point of Interest information) as balloon images 231 and 232 at locations of respective location information for example.

Through the recommendation service 230, the management center 10 appropriately provides a user such as a driver with post information corresponding to the surroundings of the current location of the driving vehicle 20 or a forward location of the vehicle 20 in the driving direction. That is, if the user of the vehicle 20 selects the recommendation service 230 by operating the navigation system 23, retrieval conditions including the current location information of the vehicle 20 are transmitted from the vehicle 20 to the management center 10 as inquiry information. The information providing device 13 makes the information retrieving device 17 retrieve post information using current location information included in the retrieval conditions received from the vehicle 20. The information retrieving device 17 retrieves post information that matches the retrieval conditions from the storage device 16 and the data servers 41 and 42, and transmits the post information acquired as a result of the retrieving to the information providing device 13. The information providing device 13 provides (delivers) the vehicle 20 with the post information transmitted from the information retrieving device 17 together with location information. While the recommendation service 230 continues active in the navigation system 23, the navigation system 23 automatically transmits current location information each time in accordance with predetermined time interval or distance interval, and the management center 10 repeatedly delivers, to the vehicle 20, post information included in a retrieval result in accordance with the transmitted current location information. The display device 23A of the navigation system 23 displays the post information provided from the management center 10 on locations corresponding to the location information as the balloon images 231 and 232, for example.

When the navigation system 23 or the information management device 10A can estimate the driving direction of the vehicle 20, in the recommendation service 230, post information to be retrieved may be previously narrowed down correspondingly to the driving direction of the vehicle. In such a case, since it is only necessary for the information management device 10A to retrieve post information that satisfies the retrieval conditions from the narrowed down post information, the information management device 10A can swiftly retrieve and select wished post information.

The posting service 220 receives, from the vehicle 20, post information that is voluntarily posted by a user from the vehicle 20 using the vehicle-mountable microphone 34 or the like, post information posted by a user by inputting using keys into the navigation system 23, or post information that is voluntarily and automatically posted by the environment-determination device 22 of the vehicle 20, together with location information corresponding to these post information, and the posting service 220 posts the received post information together with the location information to the tweet-type microblog provided by the posting service 220 itself. The posting service 220 stores the received post information in the storage device 16 together with the location information. According to this, the reply service 210 and the recommendation service 230 can also utilize the post information and the location information. That is, the posting service 220 provides microblog service of its own as an interface for receiving post information posted from the vehicle 20. According to this configuration, the post information and the location information from the vehicle 20 are provided to the information management device 10A through the interface of the microblog. The information registration management device 14 associates the location information with the post information, and then stores the associated information in the storage device 16 or posts the associated information also to the tweet-type microblog 410 through the network communication device 11.

Figure 3:
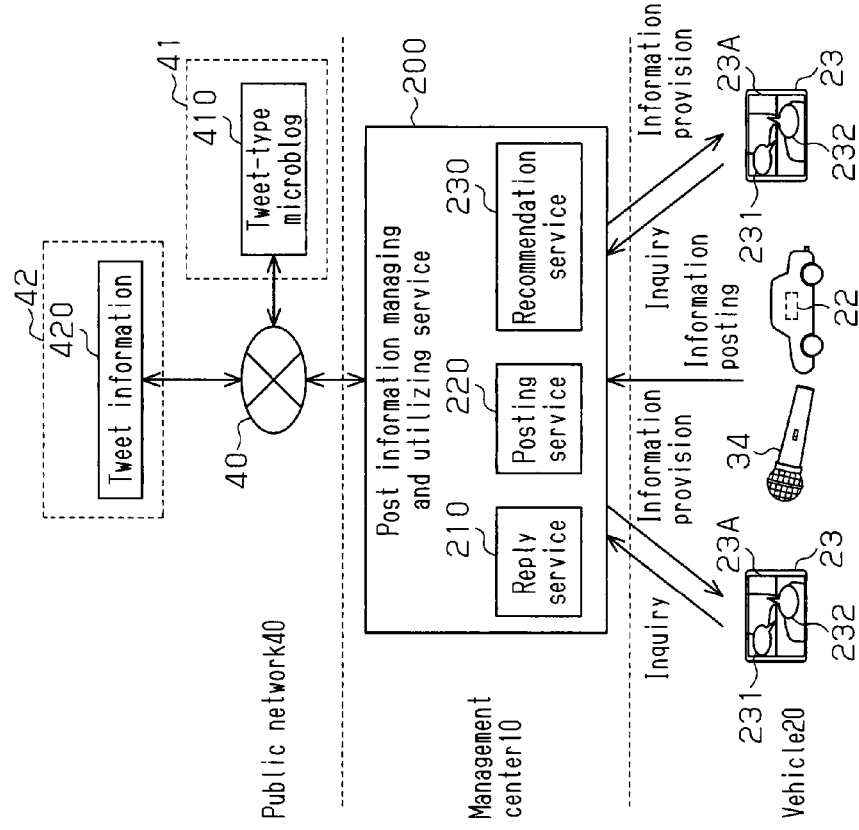
FIG. 3 is a flowchart showing an operation procedure of a management center shown in FIG. 2.

As shown in a flowchart in FIG. 3, if the information management device 10A receives inquiry information or post information from the vehicle 20, the information management device 10A starts the post information managing and utilizing service 200 (step S1 in FIG. 3). If the post information managing and utilizing service 200 has already been started, the information management device 10A may keep utilizing the already started post information managing and utilizing service 200 as it is. If the post information managing and utilizing service 200 is started and becomes available, the information management device 10A determines service (a mode of service) to be utilized from the reply service 210, the posting service 220 and the recommendation service 230 (step S2). Service to be utilized by the information management device 10A is transmitted from the vehicle 20 to the information management device 10A together with inquiry information and the like by means of a predetermined number, for example, as a result of selection by a user or the like of the vehicle 20. For example, respective service names of the services 210, 220 and 230 are displayed on the display device 23A of the navigation system 23 as a menu, and a user selects a mode that the user wishes to utilize. When the information management device 10A determines that (a mode of) the reply service 210 is selected in step S2, the information management device 10A retrieves post information (tweet information) satisfying a keyword around a designated location based on retrieval conditions sent from the vehicle 20 (step S3), and sends the post information as a retrieval result to the navigation system 23 as a vehicle-mountable device of the vehicle 20 (step S4). The retrieval conditions at that time can include a keyword and location information. As described above, the reply service 210 makes it possible for a user of the vehicle 20 to designate a keyword and retrieve corresponding tweet information. A user of the vehicle 20 can check a retrieval result on the map. Thereafter, the information management device 10A finishes providing the post information managing and utilizing service 200. Alternatively, the information management device 10A may finish only the reply service 210 while maintaining the services 220 and 230 other than the reply service 210 of the post information managing and utilizing service 200.

If the information management device 10A determines that (a mode of) the recommendation service 230 is selected in step S2 in FIG. 3, the information management device 10A retrieves post information (tweet information) concerning the current location information of the vehicle 20 based on retrieval conditions (current location information) transferred from the vehicle 20(step S5 in FIG. 3), and sends the retrieved post information to the navigation system 23 (step S6 in FIG. 3). In this embodiment, the information management device 10A is set such that the recommendation service 230 is continued to be available until the vehicle 20 instructs to finish utilizing the recommendation service 230. Hence, the information management device 10A of the recommendation service 230 timely provides the vehicle 20 with post information and location information in accordance with scenes at constant time intervals or constant travel distance intervals.

If the information management device 10A determines that (a mode of) the posting service 220 is selected in step S2 in FIG. 3, the information management device 10A posts post information transferred from the vehicle 20 and location information associated with that post information to a tweet-type microblog provided by the information management device 10A itself, stores the information in the storage device 16, and posts the information to an external tweet-type microblog (step S7 in FIG. 3). The provision of the post information managing and utilizing service 200 is finished. Alternatively, only the posting service 220 may be finished while maintaining provision of the post information managing and utilizing service 200.

Operation of the mobile information terminal, the information management device and the information management system for mobile information terminals configured as described above will be described with reference to FIGS. 4 to 6.

Figure 4:
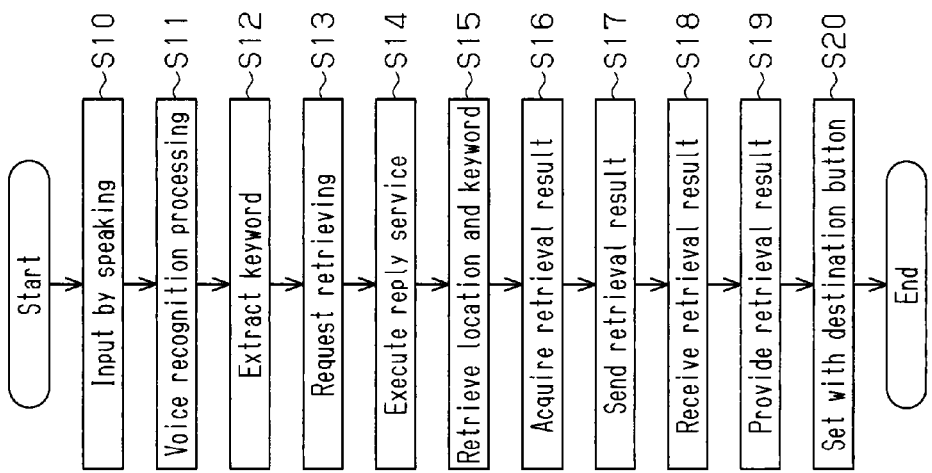
FIG. 4 is a flowchart showing one example of an operation concerning information provision of the information management system for mobile information terminals shown in FIG. 2.

FIG. 4 is a flowchart showing an operation example of the reply service 210.

As shown in FIG. 4, a user such as a driver first operates the navigation system 23 to start utilizing the post information managing and utilizing service 200 of the information management device 10A. More specifically, the user inputs, to the navigation system 23 through vehicle-mountable microphone 34 by speaking, retrieval conditions (keyword and location information) for retrieving information that the user wishes to learn and a mode of service from the services 210, 220 and 230 that the user wishes to utilize (step S10). The vehicle-mountable voice recognition device 24 converts the mode and the retrieval conditions, which are input by speaking from the voice data into character data by voice recognition processing (step S11). The navigation system 23 extracts a keyword that becomes a mode and retrieval conditions from the produced character data (step S12), and sends the extracted mode and retrieval conditions to the information management device 10A as a retrieving request (inquiry) (step S13).

The information management device 10A, which has received the retrieving request executes the reply service 210, which is the mode designated by the user (step S14), retrieves post information based on the retrieval conditions (keyword and location information, step S15), and acquires post information as a retrieval result that matches the retrieval conditions and location information that is associated with the acquired post information (step S16). The information management device 10A provides (delivers) the navigation system 23 of the vehicle 20 with the acquired post information and location information (step S17).

If the navigation system 23 receives the post information delivered from the information management device 10A (step S18), the navigation system 23 displays, in a superposed manner, the received post information on the map information of the display device 23A in accordance with the associated location information (step S19). In this manner, the display device 23A provides the user with a retrieval result as a result of inquiry from the user. Hence, the navigation system 23 functions as a display control unit, which controls the display device 23A such that acquired post information is displayed, in a superposed manner, at a location on the map information of the display device 23A as indicated by the location information acquired from the information management device 10A.

In the case of the vehicle 20 being in its stopped state, if a user touches and selects the balloon images 231 and 232 on the display device 23A, the navigation system 23 may enlarge the balloon images 231 and 232 or switch screens so that the display device 23A displays more detailed information related to the balloon images 231 and 232. Since the reply service 210 can provide a user of the vehicle 20 with information that the user wishes to learn during driving of the vehicle, it is possible to lead user to quick action and reasonable action determination, and thereby to support comfortable driving. That is, since a user of the vehicle 20 can obtain information of a high real time level, the user can determine an advantageous route. If a user touches the balloon images 231 and 232 during vehicle 20's driving, the navigation system 23 may read out details of information related to the balloon images 231 and 232 with a voice synthesizer and informs the user of the details. If a user operates a destination setting button possessed by the navigation system 23 while selecting the balloon images 231 and 232 on the display device 23A, the navigation system 23 can set a location displayed in the balloon images 231 and 232 as a driving destination of the vehicle 20 (step S20). Utilization of the reply service 210 is finished through such operations. When locations where the balloon images 231 and 232 are displayed come out from the map information on the screen of the display device 23A, the balloon images 231 and 232 disappear from the screen.

Figure 5:
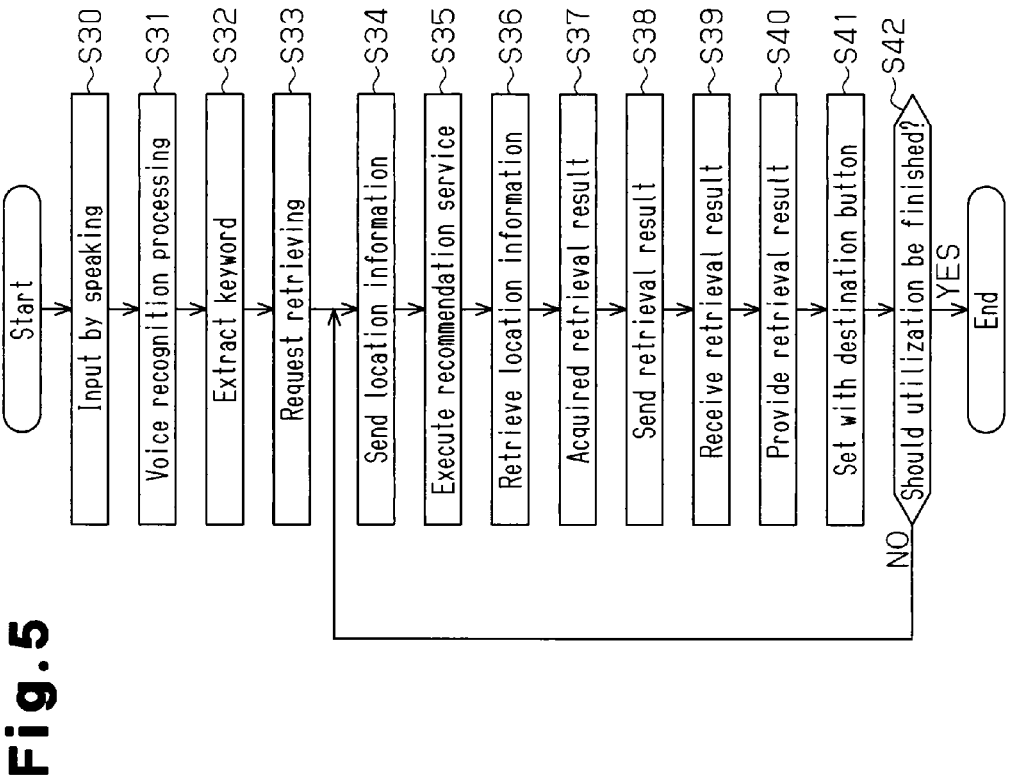
FIG. 5 is a flowchart showing another example of the operation concerning the information provision of the information management system for mobile information terminals shown in FIG. 2.

FIG. 5 is a flowchart showing an operation example of the recommendation service 230.

As shown in FIG. 5, to operate the navigation system 23 to start utilizing the post information managing and utilizing service 200, a user such as a driver inputs a mode of service that the user wishes to utilize to the vehicle-mountable microphone 34 by speaking (step S30). The navigation system 23 performs voice recognition processing (voice-character data conversion) onto an input voice to produce character data (step S31), extracts mode designation and a keyword (step S32), and sends them to the information management device 10A as a retrieving request (inquiry, step S33). Further, the navigation system 23 also sends the current location information of the vehicle 20 to the information management device 10A (step S34).

If the information management device 10A receives the mode designation and the current location information, the information management device 10A executes recommendation service 230 in accordance with the mode designation (step S35), acquires post information of the current location information of the vehicle 20 and post information around the current location information (steps S36 and S37), and delivers the acquired post information to the navigation system 23 (step S38).

If the navigation system 23 receives the post information delivered from the information management device 10A (step S39), the navigation system 23 displays, in a superposed manner, the received post information as the balloon images 231 and 232 on the map information of the display device 23A in accordance with the associated location information (step S40). That is, in this aspect also, the navigation system 23 functions as the display control unit. If the user operates the destination button while selecting the balloon images 231 and 232 on the display device 23A, the navigation system 23 sets a location displayed on the balloon images 231 and 232 as a destination (step S41).

After the series of processing, the information management device 10A determines whether utilization of the recommendation service 230 should be finished (step S42). When the user wishes to finish utilizing the recommendation service 230, the user inputs an instruction to stop the automatic recommendation into the vehicle-mountable microphone 34 by voice, or operates an automatic recommendation stopping button provided on the navigation system 23. When no instructions to stop the automatic recommendation is not provided by the user (NO in step S42), the navigation system 23 returns to step S34 to send new current location information of the vehicle 20 after a set time is elapsed or after the vehicle runs over a set travel distance, and again executes the processing operations following step S34. According to this, the information management device 10A repeatedly provides the navigation system 23 with post information around a driving location of the vehicle 20.

Hence, once a user starts utilizing the recommendation service 230, it is unnecessary for the user to carry out an operation for obtaining post information thereafter, and the recommendation service 230 is entrusted to automatically and sequentially inform the user of interesting information during driving of the vehicle from the display device 23A or a speaker. That is, the recommendation service 230 can automatically deliver, from the information management device 10A to the user of the vehicle 20, tweet information in which the user of the vehicle 20 is likely to have an interest. In this manner, the recommendation service 230 leads a user to gain an interest in a place that has been originally recognized by the user of the vehicle 20 as just a pass point and thereby makes the user find a new purpose in driving. That is, the user of the vehicle 20 can notice a new destination that has not been noticed until then and create and find curiosity about a new field. Thus, the user of the vehicle 20 learns ongoing events in the surroundings of the current location, and can obtain experience only in this location without losing the opportunity.

On the other hand, if the user operates to finish the recommendation service (YES in step S42), the navigation system 23 stops sending the current location information of the vehicle 20 to the information management device 10A, thereby finishing the recommendation service 230.

Figure 6:
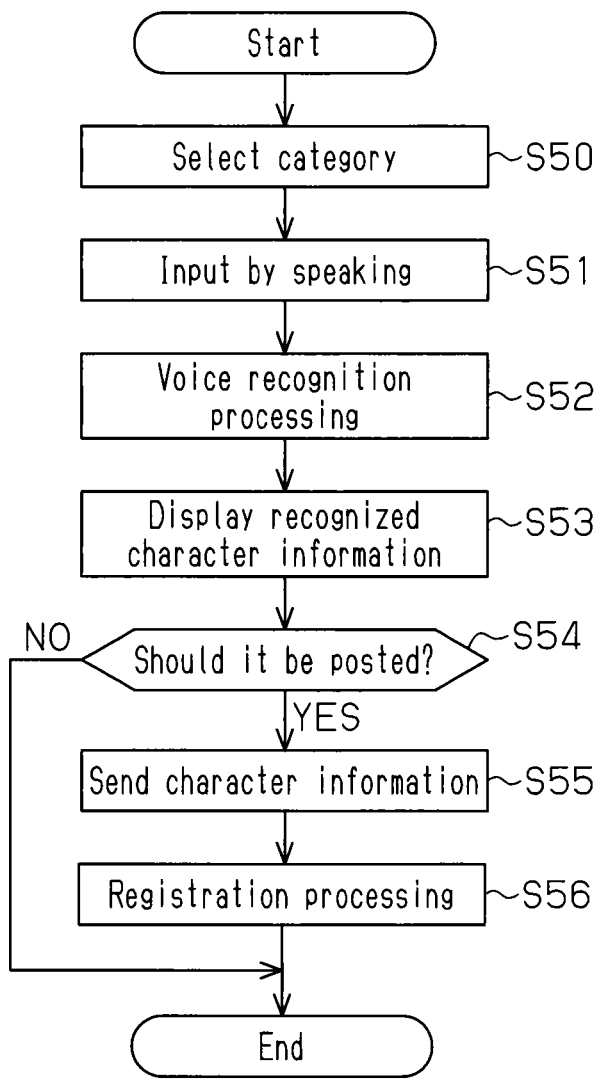
FIG. 6 is a flowchart showing one example of an operation concerning information posting of the information management system for mobile information terminals shown in FIG. 2.

FIG. 6 is a flowchart showing an operation example of the posting service 220.

As shown in FIG. 6, to operate the navigation system 23 to start utilizing the post information managing and utilizing service 200, a user such as a driver inputs to the navigation system 23 a mode designation and a field (category) of contents that the user wishes to post, by voice or a touch operation (step S50). When post information is input by voice (step S51), the navigation system 23 obtains character data through the voice recognition processing by the vehicle-mountable voice recognition device 24, and recognizes character information (step S52). The navigation system 23 makes the display device 23A display the recognized character information for the user so that the user can confirm whether the contents are correct (step S53), and makes inquiry to the user about posting intention concerning whether the contents of this character information should be posted to a tweet-type microblog (step S54). The user inputs an intention (posting intention) concerning whether this character information should be posted by an instruction such as a button operation or voice input into the navigation system 23. When the user instructs that the character information be posted (YES in step S54), the navigation system 23 associates location information with this post information and sends the character information associated with the location information to the information management device 10A as post information (step S55).

The information management device 10A executes the posting service 220 corresponding to the mode designation from the vehicle 20, and then stores (registers) the received post information and location information in the storage device 16 through a tweet-type microblog provided by the information management device 10A itself or posts the received post information and location information to an external tweet-type microblog (step S56).

In this manner, with an operation that does not put a burden on the user during driving of the vehicle, the user of the vehicle 20 easily and frequently posts, to a tweet-type microblog, information such as opinion based on actual experience (living experience) and word-of-mouth information, which has reality and which everybody wishes to learn. That is, the user of the vehicle 20 can immediately send information whenever the user wishes. A tweet-type microblog can swiftly and readily provide users of other vehicles with such detailed information. That is, since the user of the vehicle 20 thinks that posting of fresh information serves someone well, incentive of posting is enhanced, quality and quantity of post information is enriched. In the posting service 220, if a classification tag is added to post information, the post information can be utilized more easily. A user of the vehicle 20 can use post information that is posted by this user as POI information in the navigation system 23 and also as POI information of a drive plan by a telematics service.

Then, the provision of the posting service 220 is finished. On the other hand, if the user determines that character information should not be posted (NO in step S54), the navigation system 23 does not post the character information to the information management device 10A and finishes the processing.

As described above, the mobile information terminal, the information management device and the information management system for mobile information terminals of this embodiment have the following advantages.

(1) Location information is associated with post information that is delivered by the information management device 10A to the navigation system 23. Hence, the display device 23A of the navigation system 23 can display post information delivered from the information management device 10A on the map information based on the location information. Hence, since location information is associated with post information, the navigation system 23 can flexibly display the post information on any location on the map information without being constrained by facilities and the like on the map. Constraints concerning location information associated with post information are reduced. Therefore, voluntary and automatic posting of post information by the user and the vehicle 20 is facilitated and thus, convenience of the navigation system 23, which utilizes post information, is also enhanced. Especially, if the information management device 10A returns location information that is posted from the vehicle 20 back to the vehicle 20, the information management device 10A can handle, from the beginning, the location information that is deeply associated with location information shown as a location on the map information of the navigation system 23. Thus, the navigation system 23 of the post information can easily control a display on the map information.

(2) The display device 23A displays, in a superposed manner, post information on the map information of the navigation system 23 as the balloon images 231 and 232. Hence, even if post information is irregularly given to the navigation system 23, the display device 23A reliably provides a user, at a high real time level, with information that post information corresponding to map information that is being displayed exists. According to this configuration, even if post information has been accumulated in the information management device 10A from long time ago or even if post information is accumulated in the information management device 10A at the last minute, the navigation system 23 easily renews such post information displayed on the map information. Such new information is effective for use who utilizes the new information for ascertaining current traffic situation and for ascertaining ongoing events around the area. For example, a user of the vehicle 20 can learn a current status such as pinpoint weather of a destination and can learn a reason for a current traffic jam or prospects of solution to a traffic jam. It is also possible to prevent freshness of data from deteriorating at the management center 10.

(3) Further, in response to a delivery request from the navigation system 23, the information management device 10A selects post information and location information to be delivered to the navigation system 23. Hence, the information management device 10A can suitably provide post information required by the navigation system 23. For example, for an information request from the vehicle 20 based on the current location information, the information management device 10A delivers information of the surroundings of the current location of the vehicle 20. In addition, if contents of the information request from the vehicle 20 are specified by a keyword, the information management device 10A can deliver information that matches the specific contents in addition to the current location information.

(4) Although the information management device 10A manages post information that is posted from the vehicle 20 or the like, the information management device 10A is not the originator (poster) that posts post information in itself. Thus, maintenance management concerning post information is easy.

(5) The navigation system 23 can utilize more post information. Hence, convenience of the mobile information terminal, which utilizes post information, is also enhanced.

(6) The navigation system 23 can post the post information by a user's operation with respect to the navigation system 23. Therefore, the information management device 10A can receive post information associated with location information also from the navigation system 23. According to this, the information management device 10A can manage post information from the navigation system 23 together with location information. A user of the vehicle 20 easily posts post information including location information to the information management device 10A. A user on the vehicle 20 can send not only simple information that is automatically sent such as "The vehicle 20 has been caught in traffic jam" or "It's starting to rain", but also detailed information and specific information including the degree of a traffic jam or the quantity of rain from the same account as the vehicle 20.

(7) The environment-determination device 22 of the vehicle 20 can automatically send post information based on an event that has occurred with respect to the vehicle 20. Hence, it becomes possible to automatically post the post information from the vehicle 20. According to this, quality and quantity of post information held by the information management device 10A or the like are enhanced, and convenience of the navigation system 23, which utilizes post information, is also enhanced.

(8) The information management device 10A can provide the navigation system 23 with post information accumulated in the data servers 41 and 42 connected to the information management device 10A through a public network 40 such as the Internet. As described above, since post information provided by the information management device 10A to the navigation system 23 is based on one or more pieces of post information possessed by the data servers 41 and 42 connected to the public network 40, the number of pieces of post information that can be provided by the information management device 10A to the navigation system 23 is automatically increased. Hence, convenience of the navigation system 23, which utilizes these post information, is further enhanced.

(9) Among the post information accumulated in the data servers 41 and 42 and the like, there is post information with which location information matching map information of the navigation system 23 is not associated. However, the information management device 10A can associate location information matching map information of the navigation system 23 also with such post information. Even when location information used by a delivery request (retrieval conditions) sent from the navigation system 23 to the information management device 10A cannot be used as it is for retrieving post information accumulated in the data servers 41 and 42, the information management device 10A can convert specifications of such location information into specifications of location information like data servers 41 and 42, and thereby using the converted specifications for retrieving.

(10) The navigation system 23 mounted in a vehicle 20 that has a high speed and is required to efficiently collect information can display post information on the map information. Hence, it is possible to provide a user such as a driver of the vehicle 20 with new information.

Especially, if a driving speed is used as an event (parameter) that has occurred in the vehicle 20 to cause the environment-determination device 22 of the vehicle 20 to automatically post information, it is possible to easily determine whether there is a traffic jam in the roads in the vicinity, to which information is posted in real time. Also, it is possible to provide information that is effective for a driving operation of the vehicle 20 and the like.

(11) The vehicle-mountable voice recognition device 24 allows a user during driving the vehicle 20, who cannot easily input information using characters, to input post information to the navigation system 23. According to this, user's posting of post information having a high real time level is facilitated, and the quantity and quality of the post information that becomes a base of retrieving are enriched. Hence, convenience of the navigation system 23, which utilizes the post information, is further enhanced.

A user of the navigation system 23 is limited to a user of the vehicle 20. Thus, if the vehicle-mountable voice recognition device 24 is adapted such that characteristics of voice of individual user are previously ascertained, the vehicle-mountable voice recognition device 24 can carry out precise voice-character conversion.

(Second Embodiment)

An information management system for mobile information terminals according to a second embodiment of the present invention will be described below with reference to FIGS. 7 to 10. The second embodiment is different from the first embodiment in that post information is posted not only from the navigation system 23 but also from a user 50 and a shop 60. Since other configurations of the second embodiment are the same as those of the first embodiment, different points are mainly described below, and the same symbols are allocated to the same configuration and description thereof will be omitted.

Figure 7:
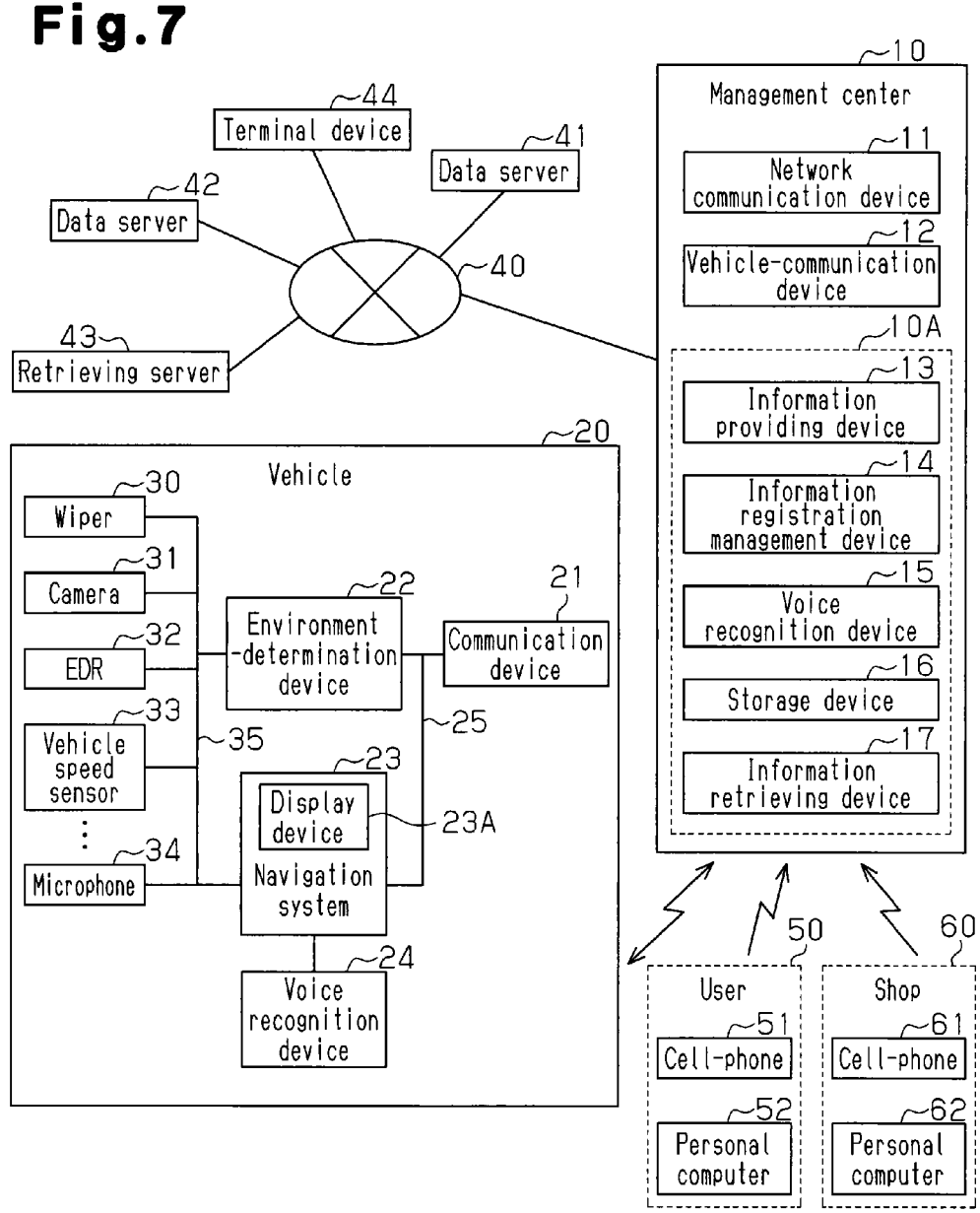
FIG. 7 is a schematic diagram showing an outline configuration of an information management system for mobile information terminals according to a second embodiment of the invention is embodied.

As shown in FIG. 7, an information management system for mobile information terminals of this embodiment also includes mobile phones 51 and 61 and personal computers 52 and 62 as other mobile information terminals having authorities for accessing management center 10. More specifically, the user 50 of the mobile information terminal has the mobile phone 51 and the personal computer 52 capable of performing wireless or wired data communication with respect to the management center 10 as means for posting post information to the management center 10. The shop 60 also includes the mobile phone 61 and the personal computer 62 capable of performing wireless or wired data communication with respect to the management center 10 as means for posting post information to the management center 10. According to this, as shown in FIG. 8, post information is posted to posting service 220 of a post information managing and utilizing service 200 from a vehicle-mountable microphone 34 of a vehicle 20, a mobile phone 51 and the personal computer 52 of the user 50, and the mobile phone 61 and the personal computer 62 of the shop 60. The mobile phones 51 and 61 and the personal computers 52 and 62 are set to add location information of predetermined specifications to post information that are posted from the mobile phones 51 and 61 and the personal computers 52 and 62. The information management device 10A converts the location information of predetermined specifications added to the post information into location information of the specifications used by the information management device 10A by location information conversion function of an information retrieving device 17.

The post information managing and utilizing service 200 of the embodiment includes a weighting list 70 for defining an importance degree based on a combination of post information that is automatically posted (automatically sent) from a environment-determination device 22 of the vehicle 20 and post information posted by the user from the navigation system 23. As shown in FIG. 9, the weighting list 70 is held by the storage device 16 of the information management device 10A or the like, and is used, when an information providing device 13 as a weighting means delivers post information to the vehicle 20, to determine an importance degree of the post information and to carry out delivery in accordance with the importance degree. For example, the information providing device 13 weights post information that matches a delivery request with reference to the weighting list 70, and the information providing device 13 delivers, to the vehicle 20, post information in descending order of weight, i.e., degree of importance.

For example, it is assumed that there are two pieces of post information having adjacent locations indicated by location information relationship (e.g., of 20 meters or less). If the two pieces of post information do not include post information that is automatically sent from the vehicle 20 or post information that is posted from the user 50 of the vehicle 20, importance degree (priority degree) of these two pieces of post information is set to "1," which is the lowest of importance degree. Such a case is considered that accuracy (objectivity, reliability) is low because the importance degree "1" means a case where there are two pieces of post information only from the shop 60, for example. When two pieces of post information having adjacent locations indicated by location information include post information that is automatically sent from the vehicle 20 but not include post information posted from the user 50 of the vehicle 20, the importance degree of the two pieces of post information is set to "2", which is the second lowest of the importance degree. For example, the importance degree "2" means a case where the environment-determination device 22 of the vehicle 20 posts post information of incorrect contents or post information of contents that are not important for the user 50. That is, even when the environment-determination device 22 of the vehicle 20 automatically posts incorrect information or information that is not important for the user 50, without additional information (post information of the same contents) from the user 50, the information management device 10A can determine that automatic posting from the vehicle 20 should not be taken seriously.

Further, when two pieces of post information having adjacent locations indicated by location information do not include post information that is automatically sent from the vehicle 20 but include post information posted from the user 50 of the vehicle 20, importance degree of the two pieces of post information is set to "3," which is the second highest degree of importance. For example, importance degree "3"

indicates a case where, although the vehicle 20 has not passed through that location, a user 50 who heard rumors of that location posts the rumors, or a case where information has contents not automatically sent from the vehicle 20 at that location but noticed by the user 50. When two pieces of post information having adjacent locations indicated by location information include post information that is automatically sent from the vehicle 20 and also include post information posted from the user 50 of that vehicle 20, the importance degree of the two pieces of post information is set to "4," which is the highest degree of importance. For example, the importance degree "4" indicates a case where the vehicle 20 actually has just passed through that location and automatically sends post information at that location, and the user 50 realizes the same information at that location and posts the information.

According to this, even if the number of pieces of post information to be delivered is large, the information management device 10A delivers, to the vehicle 20, post information in the order from the importance degree "4", "3", "2" and "1" until the maximum number of pieces of post information that is determined in consideration of the number of balloon images which the display device 23A can actually display.

When the information management device 10A weights post information, the information management device 10A may consider whether user accounts coincide with each other between post information that is automatically sent from the environment-determination device 22 and post information that is posted by the user 50 from the navigation system 23, the mobile phone 51 and the personal computer 52 based on a combination thereof. For example, when a user account of post information that is automatically sent from the environment-determination device 22 coincides with a user account of post information that is posted from the navigation system 23, the mobile phone 51 or the personal computer 52, it is considered that association between both posts is at high level. Therefore, the importance degree of both the posts is set to high. When user accounts of both posts do not coincide with each other, it is considered that association between both posts is at low level. Therefore, the importance degree of both the post information can be set low. The information providing device 13 may deliver all of post information that is regarded as important to the navigation system 23, and the navigation system 23 may select post information to be displayed as balloon images 231 and 232 in accordance with the importance degree.

Next, an operation of the information management system for mobile information terminals configured as described above will be described with reference to FIG. 10.

As shown in FIG. 10, for example, the shop 60 posts (sends) the information "right turn lane in the vicinity of XX intersection has a traffic jam due to a newly-opened shop" as post information P1 to the management center 10 together with predetermined location information. From such post information from the shop 60, the information management device 10A can acquire specific information that cannot be covered by existing VICS, i.e., detailed information concerning which lane (right turn lane) of which location range (in the vicinity of XX intersection) has a traffic jam. Post information P2 that "bathrooms of SA (service area) are busy", post information P3 that "my vehicle runs only YY m per hour", and post information P4 that "I have been caught in a traffic jam" are also sent from users 50 such as drivers to the management center 10 together with corresponding location information. Further, the post information P3 that "my vehicle runs only YY m per hour", and the post information P4 that "I have been caught in a traffic jam" are automatically posted (sent) to the management center 10 together with corresponding location information from the environment-determination devices 22 of vehicles 20 when detecting that the vehicles 20 cannot run for given time. In this example, accounts of the post information P2 and P3 by the user 50 are the same accounts of the post information P2 and P3 automatically posted from the vehicle 20 utilized by the same user 50.

Contents of post information posted from the environment-determination device 22 of the vehicle 20 need not be completely the same (one to one relationship) with contents of post information that is voluntarily posted from the user 50. For example, post information of (abstract concept, broader concept) that "it started raining" may automatically be posted from the environment-determination device 22 of the vehicle 20, and post information of a specific state (specific example, narrower concept) of rain such as "thunderstorm" or "heavy rain" may be posted from the user 50. In this case, the information management device 10A can determine that these posts are related to each other, i.e., that they have the same content by extracting a keyword or the like and analyzing the contents of both posts.

When the information providing device 13 of the information management device 10A delivers the above-described post information to the vehicle 20, the information providing device 13 adds an importance degree "1" to the post information P1 from the shop 60, adds an importance degree "3" to the post information P2 only from the user 50, and adds importance degree "4" to the post information P3 and P4 respectively from the user 50 and the environment-determination device 22. The information providing device 13 of the information management device 10A preferentially selects information having a high importance degree from post information of delivery candidates in accordance with limitation of a number of balloon images which can be displayed by the display device 23A. That is, the post information is delivered to other vehicles 20a which utilize the reply service 210 or the recommendation service 230 based on the importance degree. For example, two pieces of post information P3 and P4 having the importance degree "4" are preferentially delivered to the other vehicle 20A and the display device 23A to display the balloon image 233, and when the display device 23A affords to receive another delivery, i.e., can further display the balloon image 234, the post information P2 having the importance degree "3" is delivered, and when the display device 23A can afford to receive another delivery, i.e., when the display device 23A can further display a balloon image 235, the post information P1 having the importance degree "1" is delivered. According to this, the vehicle 20 to which post information is delivered and the display device 23A of the navigation system 23 of another vehicle 20A display that post information in a superposed manner like the balloon images 233, 234 and 235.

As described above, the information management system for mobile information terminals according to this embodiment in FIG. 7 have advantages that are the same or similar to (1) to (11) described in the advantage of the first embodiment, and further have the following advantage.

(12) The information management device 10A weights, based on a combination, information that is automatically sent from the environment-determination device 22 (communication means) and post information that is posted through the navigation system 23, the mobile phones 51 and 61 or the personal computers 52 and 62 out of post information that is posted. Hence, the information management device 10A can give a priority to post information that is posted. According to this, the information management device 10A gives a predetermined priority to post information to which it is difficult to give a priority because it generally does not have regularity, and the information management device 10A delivers the post information to the vehicle 20 or other vehicle 20A based on the priority. Hence, convenience of the navigation system 23, which utilizes these post information, is further enhanced.

Further, if the priority of information having low accuracy is set low and a priority of information having high accuracy is set high, the information management device 10A can enhance the precision of post information provided by the navigation system 23.

Other Embodiments

The above-described embodiments may be modified as follows.

In the first embodiment, it is illustrated that one vehicle 20 is wirelessly connected to the management center 10. However, the invention is not limited to this, and it is preferable that a plurality of vehicles be wirelessly connected to the management center. When multiple vehicles are connected, the number of pieces of post information to be handled by the management center is increased. Therefore, it is expected that quality and quantity of post information to be handed by the post information managing and utilizing service are enhanced. Thus, the information management device can provide vehicles with newer information, and quality of information to be delivered to vehicles can be enhanced.

In each of the above embodiments, it is illustrated that the vehicle 20 can utilize the three services, i.e., the reply service 210, the recommendation service 230 and the posting service 220 of the information management device 10A, but the invention is not limited to this, and it is only necessary that the vehicle can utilize at least one of the reply service 210, the recommendation service 230 and the posting service 220. According to this, flexibility of a way of utilizing the post information managing and utilizing service on the side of the vehicle is enhanced, and it has only a configuration that is required by service utilized by a user.

In each of the above-described embodiments, it is illustrated that the post information managing and utilizing service 200 includes all of the three services, i.e., the reply service 210, the recommendation service 230 and the posting service 220. However, the invention is not limited to this, and it is only necessary that the post information managing and utilizing service has one or more of the reply service, the recommendation service and the posting service. For example, even if the post information managing and utilizing service has only the reply service and the recommendation service, it is possible to cooperate with another management center or utilize a public network, providing these services without any problem. Even if the post information managing and utilizing service has only the posting service, the post information managing and utilizing service cooperates with other management center, and it is possible to provide a vehicle with post information as reply service or recommendation service. According to this, flexibility of configurations of the information management device, the information management device and the information management system for mobile information terminals of the invention can be enhanced.

Figure 11:
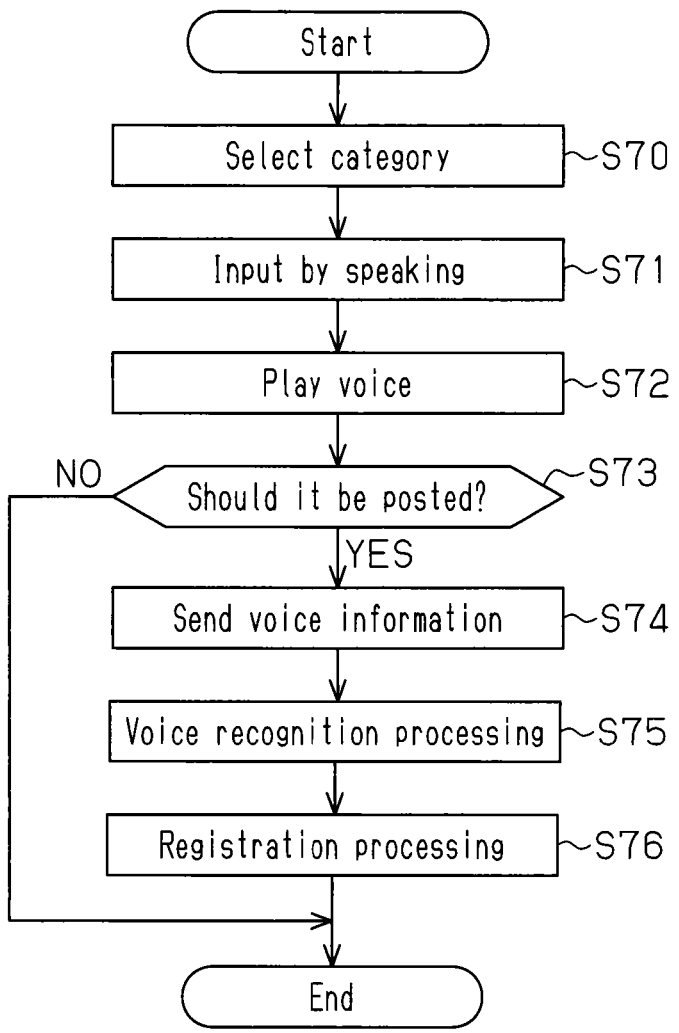
FIG. 11 is a flowchart showing another example of an operation concerning information posting of the information management system for mobile information terminals shown in FIG. 6.

In each of the above-described embodiments, it is illustrated that post information received by the information management device 10A includes character data, but the invention is not limited to this, and the information management device 10A may receive post information including voice data. For example, as shown in FIG. 11, a user starts utilizing the posting service 220, selects a category that is to be posted by the navigation system 23 (step S70), inputs post information by speaking (step S71) and then, plays the input voice (step S72). If the input voice is played, the navigation system 23 determines whether the post information should be posted (step S73). The decision whether the post information should be posted is made based on an inputting operation of posting intention of the user on a selection screen displayed on the display device 23A or based on a result of display of posting intention by further speaking. When the navigation system 23 determines that post information should not be posted (NO in step S73), post information is not posted and the posting processing in the navigation system 23 is finished. When it is determined that post information should be posted on the other hand (YES in step S73), the navigation system 23 posts (sends) post information including voice data to the information management device 10A of the management center 10 (step S74). The information management device 10A carries out the voice-character conversion of post information including voice data by the voice recognition processing using the center voice recognition device 15, and produces post information including the character data (step S75). Then, the information management device 10A registers the post information including the character data through the information registration management device 14, thereby storing the post information together with location information in the storage device 16 (step S76). The processing of posting service 220 conducted by the information management device 10A and the utilization processing of the post information managing and utilizing service 200 in the navigation system 23 are finished.

According to this configuration, in the information management device 10A, even if post information including voice data is posted by a user during driving a vehicle, who cannot easily input information by characters, this post information can be managed as post information including character data. According to this, posting of post information of a high real time level from a user of the vehicle 20 is facilitated, and quantity and quality of post information to be handled by the information management device 10A is enriched. Hence, convenience of the navigation system 23 which utilizes these post information is further enhanced.

Further, the information management device 10A carries out the voice-character conversion processing having a relatively high processing load. Hence, it is possible to lower a processing load of the navigation system 23, and although the voice-character conversion processing has the high load, the information management device 10A can execute the precise voice-character conversion processing.

In each of the above-described embodiments, it is illustrated that information based on voice by the user of the vehicle 20 speaking is posted to the information management device 10A as post information if the user inputs some sort of operation into the navigation system 23. That is, the user inputs into the navigation system 23 that input information is confirmed on the display device 23A or inputs a final posting intention into the navigation system 23. However, the invention is not limited to this, and the navigation system 23 may post the post information automatically based on only conversation in the vehicle. For example, when a vehicle starts moving toward another place without stopping or parking after having reached a destination, the navigation system 23 may extract predetermined keywords such as "store is crowded", "store is closed" and "parking lot is full" from conversation in the vehicle, and the navigation system 23 may automatically post the extracted keywords to the information management device 10A as post information related to location information of the destination. According to this, since the number of postings of post information to the information management device 10A is increased, it is expected that quality and quantity of information are enhanced. Therefore, utilization values of the mobile information terminal, the information management device and the information management system for mobile information terminals are enhanced. That is, information of current stores and traffic jams are easily provided to the vehicles in the vicinity.

Figure 12:
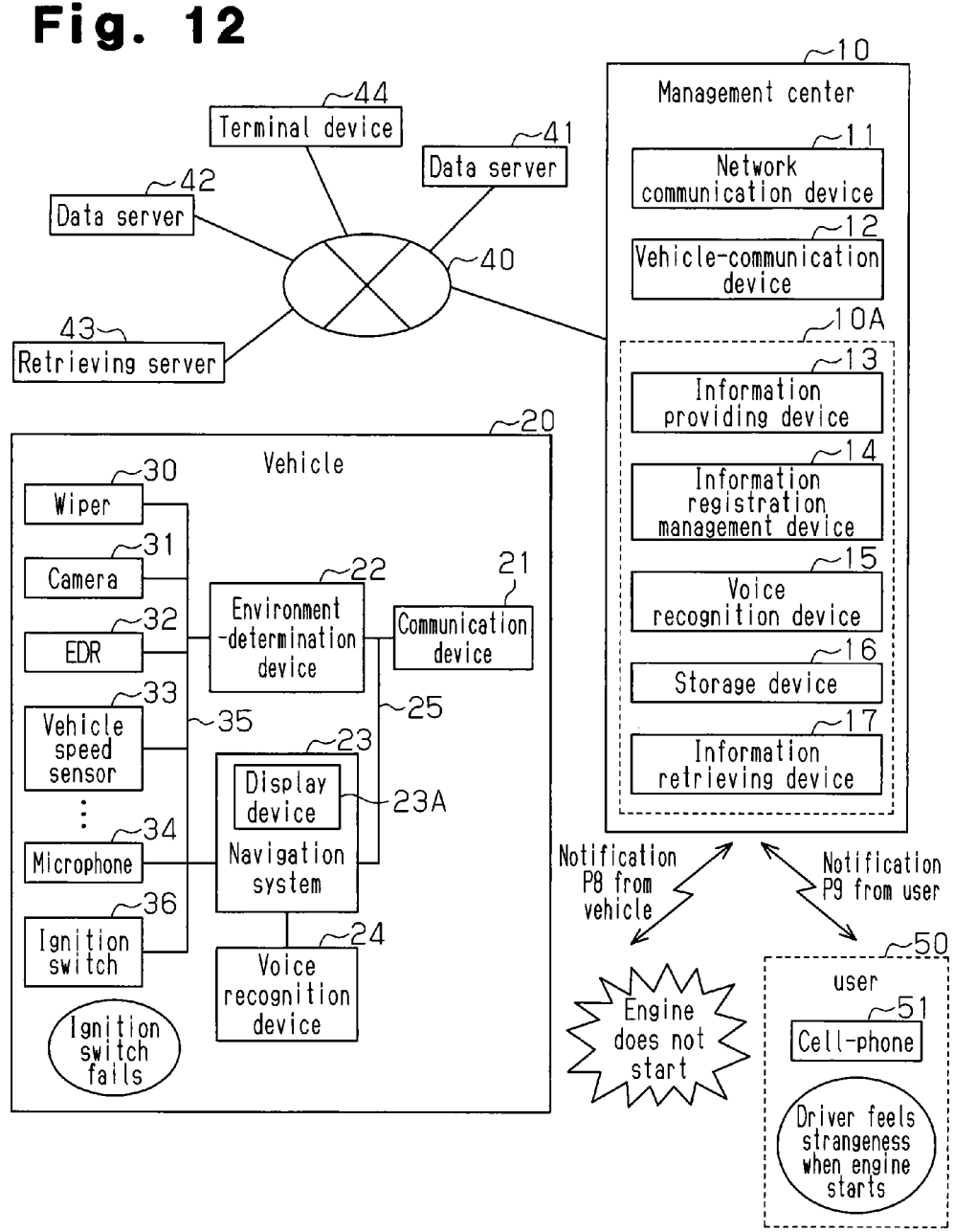
FIG. 12 is a schematic diagram showing another operation example concerning the information management system for mobile information terminals shown in FIG. 7.

In the second embodiment, it is illustrated that the information management device 10A uses the weighting list 70 for determining a delivering order of post information. However, the invention is not limited to this, and the information management device 10A may sense a defective condition or a failure of the vehicle based on information having a high importance degree with respect to the weighting list. For example, as shown in FIG. 12, an ignition switch 36 capable of outputting defective condition information is connected to the environment-determination device 22 and the navigation system 23 of the vehicle 20 through the vehicle-mountable network 35. For example, it is assumed that the environment-determination device 22 automatically posts that a failure occurs in the ignition switch 36 as post information (notification P8 from vehicle). Further, it is assumed that the user 50 voluntarily posts that the user feels strangeness when an engine starts as post information (notification P9 from user). In this case, the information registration management device 14 of the information management device 10A, when receiving the notification P8 from the vehicle and the notification P9 from the user, confirms that accounts of both the notifications are the same, time zones when the notifications have been posted are close to each other, and location information when the notifications has been posted are close to each other, and then regards the notification P8 from the vehicle and the notification P9 as being related to each other (in conjunction with each other) and links up them with each other. That is, each importance degree of both the notifications P8 and P9 is set to "4". With this link, accuracy of the information of the notification P8 from the vehicle is maintained at a high level, and the information management device 10A can precisely estimate that a defective condition that the vehicle 20 cannot "start the engine" occurs. According to this, the information management device 10A can precisely analyze the defective condition and the failure of the vehicle 20, and it becomes possible to inform the user or a car dealer of a precise analysis result for swiftly solving or handling the defective condition and the like of the vehicle.

In each of the above-described embodiments, it is described that the management center 10 can be connected to the public network 40 through the network communication device 11, but the invention is not limited to this, and it is possible to employ a configuration that the management center cannot be connected to the public network. According to this configuration also, it is possible to provide the post information managing and utilizing service 200 based on post information stored in the storage device of the management center.

Although it is illustrated that the information management device 10A includes the center voice recognition device 15 in each of the above-described embodiments, the invention is not limited to this, and the information management device may not include a voice recognition device. In this case also, the information management device can handle post information that is posted as character data, and post information of voice data is converted into character data by a navigation system or the like and then the converted post information is provided to the information management device. Thus, the resulting post information can be handled without any problem. Therefore, it is possible to provide service by applying such a converting manner to the information management device, the information management device and the information management system for mobile information terminals of the invention.

Although it is illustrated that the navigation system 23 includes the vehicle-mountable voice recognition device 24 in each of the above-described embodiments, the invention is not limited to this, and the navigation system may not include a voice recognition device. In this case also, a user can post the post information and input a delivery request of post information by touch-operating the navigation system without any problem. Therefore, it is possible to provide service by applying such an input manner to the information management device, the information management device and the information management system for mobile information terminals of the invention.

It is illustrated that the mobile information terminal is the navigation system 23 in each of the above-described embodiments. However, the invention is not limited to this, and the mobile information terminal may be various kinds of vehicle-mountable vehicle control devices and vehicle-mountable devices that control a sound system or the like. According to this, the mobile information terminal, the information management device and the information management system for mobile information terminals of the invention can widely be applied to vehicle-mountable devices.

The mobile information terminal of the invention is not limited to a vehicle-mountable information processing device such as the navigation system, and may be a terminal that can be carried by a person such as a mobile phone and a portable navigation system, or may be a terminal attached to an object that can freely be moved.

DESCRIPTION OF THE REFERENCE NUMERALS

10: management center
10A: information management device
11: network communication device
12: vehicle-communication device
13: information providing device
14: information registration management device
15: center voice recognition device
16: storage device
17: information retrieving device
20: vehicle
20A: other vehicle
21: vehicle-mountable communication device
22: environment-determination device
23: navigation system
23A: display device
24: vehicle-mountable voice recognition device
25: vehicle-mountable network
30: wiper
31: vehicle-mountable camera
32: EDR
33: vehicle speed sensor
34: vehicle-mountable microphone
35: vehicle-mountable network
36: ignition switch
40: public network
41, 42: data server
43: retrieving server 50: user
51, 61: mobile phone
52, 62: personal computer
60: shop
70: weighting list
231 to 235: balloon image

The invention claimed is:

1. An information management device provided in a management center, which manages delivery and reception of information through wireless communication between mobile information terminals respectively provided in a plurality of vehicles, the information management device comprising:
 a post information management unit, which receives location information and post information posted from the mobile information terminals, and which associates the received location information and post information with each other and manages the location information and the post information;
 a weighting unit, wherein, based on detection of change of driving environment, the vehicle automatically transmits, together with the location information of the vehicle, information indicative of the change in the driving environment, and wherein the weighting unit weights the post information and the location information based on a combination of the information indicative of the change in the driving environment and information posted through the mobile information terminals; and
 a delivery control unit, which, in response to a request from any of the mobile information terminals, selects the managed location information and the managed post information that correspond to the request and delivers, from the selected location information and the selected post information, the post information and the location information having high priorities based on the weighting, wherein, to allow a display device of the mobile information terminal that has sent the request to display, in a superposed manner, the selected post information on a location of a map information indicated by the selected location information, the delivery control unit delivers the selected location information and the selected post information to the mobile information terminal that has sent the request, wherein
 the weighting unit is configured to set a priority degree of the post information and the location information high when a user account of the information indicative of the change in the driving environment coincides with a user account of the information posted through the mobile information terminals, and
 the weighting unit is configured to set the priority degree of the post information and the location information low when the user account of the information indicative of the change in the driving environment does not coincide with the user account of the information posted through the mobile information terminals.

2. The information management device according to claim 1, wherein the information management device receives, as information that is based on an operation of a user of the mobile information terminal, the post information posted together with the location information.

3. The information management device according to claim 2, wherein the post information posted together with the location information includes information that has been automatically sent from the mobile information terminal based on an event that has occurred in the mobile information terminal.

4. The information management device according to claim 1, wherein
 a terminal device is connected to the information management device through a public network, and
 the location information and the post information managed by the post information management unit include information that has been posted by the terminal device connected to the public network.

5. The information management device according to claim 1, further comprising a function for converting the post information received together with the location information from voice data into character data and managing the converted post information.

6. An information management system for mobile information terminals comprising mobile information terminals respectively provided in a plurality of vehicles and an information management device provided in a management center, which manages delivery and reception of information through wireless communication between the mobile information terminals, wherein
 each of the vehicles includes a detection unit for detecting change in a driving environment of the vehicle and a communication unit for automatically sending, together with location information of the vehicle, information indicative of the change in the driving environment detected by the detection unit to the information management device,
 the information management device includes:
  a post information management unit, which receives location information and post information posted from any of the mobile information terminals, and which associates the received location information and the received post information with each other and manages the location information and the post information;
  a weighting unit for weighting the post information and the location information based on a combination of information that has been automatically sent from the communication unit and information posted through the mobile information terminals; and
  a delivery control unit, which, in response to a request from any of the mobile information terminals, selects the managed location information and the managed post information that correspond to the request, and delivers, from the selected location information and the selected post information and to the mobile information terminal that has sent the request, the post information and the location information having high priorities based on the weighting, wherein
 the mobile information terminal that has requested delivery of the post information is configured to acquire the location information and the post information that have been associated with each other and delivered from the information management device, and to control a displaying manner of a display device such that the acquired post information is displayed, in a superposed manner, on a location of a map information indicated by the acquired location information,
 the weighting unit is configured to set a priority degree of the post information and the location information high when a user account of the information indicative of the change in the driving environment coincides with a user account of the information posted through the mobile information terminals, and
 the weighting unit is configured to set the priority degree of the post information and the location information low when the user account of the information indicative of the change in the driving environment does not coincide with the user account of the information posted through the mobile information terminals.

7. The information management system for mobile information terminals according to claim 6, wherein the information management device receives, as information that is based on an operation of a user of any of the mobile information terminals, the post information posted together with the location information.

8. The information management system for mobile information terminals according to claim 7, wherein the post information posted to the information management device together with the location information includes information that has been automatically sent from the mobile information terminal based on an event that has occurred in the mobile information terminal.

9. The information management system for mobile information terminals according to claim 6, wherein
a terminal device is connected to the information management device through a public network, and
the location information and the post information managed by the post information management unit include information posted by the terminal device connected to the public network.

10. The information management system for mobile information terminals according to claim 6, wherein each of the mobile information terminals includes a function for converting the post information from voice data into character data and sending the converted post information to the information management device.

11. The information management system for mobile information terminals according to claim 6, wherein the post information management unit further includes a function for converting the post information received together with the location information from voice data into character data and managing the converted post information.

12. The information management device according to claim 1, wherein
the weighting unit is configured to set a priority degree of the post information and the location information high when the two pieces of post information having adjacent locations indicated by location information if the two pieces of post information include the information indicative of the change in the driving environment and the information posted through the mobile information terminals.

13. The information management system for mobile information terminals according to claim 6, wherein
the weighting unit is configured to set a priority degree of the post information and the location information high when the two pieces of post information having adjacent locations indicated by location information if the two pieces of post information include the information indicative of the change in the driving environment and the information posted through the mobile information terminals.

14. An information management device provided in a management center, which manages delivery and reception of information through wireless communication between mobile information terminals respectively provided in a plurality of vehicles, the information management device comprising:
a post information management unit, which receives location information and post information posted from the mobile information terminals, and which associates the received location information and post information with each other and manages the location information and the post information;
a weighting unit, wherein, based on detection of change of driving environment, the vehicle automatically transmits, together with the location information of the vehicle, information indicative of the change in the driving environment, and wherein the weighting unit weights the post information and the location information based on a combination of the information indicative of the change in the driving environment and information posted through the mobile information terminals; and
a delivery control unit, which, in response to a request from any of the mobile information terminals, selects the managed location information and the managed post information that correspond to the request and delivers, from the selected location information and the selected post information, the post information and the location information having high priorities based on the weighting, wherein, to allow a display device of the mobile information terminal that has sent the request to display, in a superposed manner, the selected post information on a location of a map information indicated by the selected location information, the delivery control unit delivers the selected location information and the selected post information to the mobile information terminal that has sent the request, wherein
the weighting unit is configured to set the priority degree of the post information and the location information high when two pieces of post information having adjacent locations indicated by location information include post information posted through the mobile information terminals but do not include post information that is indicative of the change in the driving environment, and
the weighting unit is configured to set a priority degree of the post information and the location information low when two pieces of post information having adjacent locations indicated by location information include post information that is indicative of the change in the driving environment but do not include post information posted through the mobile information terminals.

15. An information management system for mobile information terminals comprising mobile information terminals respectively provided in a plurality of vehicles and an information management device provided in a management center, which manages delivery and reception of information through wireless communication between the mobile information terminals, wherein
each of the vehicles includes a detection unit for detecting change in a driving environment of the vehicle and a communication unit for automatically sending, together with location information of the vehicle, information indicative of the change in the driving environment detected by the detection unit to the information management device,
the information management device includes:
a post information management unit, which receives location information and post information posted from any of the mobile information terminals, and which associates the received location information and the received post information with each other and manages the location information and the post information;
a weighting unit for weighting the post information and the location information based on a combination of information that has been automatically sent from the communication unit and information posted through the mobile information terminals; and a delivery control unit, which, in response to a request from any of the mobile information terminals, selects the managed location information and the managed post information that correspond to the request, and delivers, from the selected location information and the selected post information and to the mobile information terminal that has sent the request, the post information and the location information having high priorities based on the weighting, wherein the mobile information terminal that has requested delivery of the post information is configured to acquire the location information and the post information that have been associated with each other and delivered from the information management device, and to control a displaying manner of a display device such that the acquired post information is displayed, in a superposed manner, on a location of a map information indicated by the acquired location information, wherein the weighting unit is configured to set the priority degree of the post information and the location information high when two pieces of post information having adjacent locations indicated by location information include post information posted through the mobile information terminals but do not include post information that is indicative of the change in the driving environment, and the weighting unit is configured to set a priority degree of the post information and the location information low when two pieces of post information having adjacent locations indicated by location information include post information that is indicative of the change in the driving environment but do not include post information posted through the mobile information terminals.

\* \* \* \* \*